(12) United States Patent
Tsujii et al.

(10) Patent No.: US 6,507,615 B1
(45) Date of Patent: Jan. 14, 2003

(54) VIDEO SIGNAL PROCESSING APPARATUS AND VIDEO SIGNAL PROCESSING METHOD

(75) Inventors: Satoshi Tsujii, Tokyo (JP); Makoto Yamada, Tokyo (JP); Naoki Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/301,497

(22) Filed: Apr. 28, 1999

(30) Foreign Application Priority Data

Apr. 30, 1998 (JP) .......................................... 10-121220

(51) Int. Cl.⁷ ................................................ H04N 7/12
(52) U.S. Cl. ................................................ 375/240.04
(58) Field of Search ....................... 375/240.17, 240.04; 348/409.1; 382/107, 236

(56) References Cited

U.S. PATENT DOCUMENTS

| | | | | |
|---|---|---|---|---|
| 4,862,264 A | * | 8/1989 | Wells et al. ................. | 358/138 |
| 5,754,700 A | * | 5/1998 | Kuzma ........................ | 382/236 |
| 5,809,201 A | * | 9/1998 | Nagasawa .................... | 386/68 |
| 6,198,772 B1 | * | 3/2001 | Boice et al. ................ | 375/240.17 |
| 6,282,242 B1 | * | 8/2001 | Isozaki et al. .............. | 375/240.04 |
| 6,330,344 B1 | * | 12/2001 | Kondo et al. ................ | 382/107 |

* cited by examiner

*Primary Examiner*—Chris Kelley
*Assistant Examiner*—George A Bugg
(74) *Attorney, Agent, or Firm*—Frommer Lawrence & Haug LLP; William S. Frommer; Darren M. Simon

(57) ABSTRACT

A video signal processing apparatus and a video signal processing method can switch resolution effectively and efficiently. The video signals coming from an imaging apparatus is converted into digital signals by an A/D converter 2 an compressed by a compressor 3. The compressed video signals are written into a recording medium 5 by means of a write device 4. The compressor 3 encodes the video signals for each group of pictures comprising a plurality of pictures and the camera compression control unit 6 controls the compressor 3 so as encode the pictures of a first group of pictures and those of a second group of pictures arranged temporally adjacent to the first group of pictures, while maintaining the number of pictures of two temporally adjacent groups of pictures that contain a resolution change point of video signals to a constant value, and change the resolution of the pictures of the two groups of pictures.

6 Claims, 17 Drawing Sheets

704 PIXELS
480 PIXELS
4 : 2 : 0

528 PIXELS
480 PIXELS

352 PIXELS
480 PIXELS
HHR (HalfHorizontalResolution of 4 : 2 : 0)

352 PIXELS
240 PIXELS

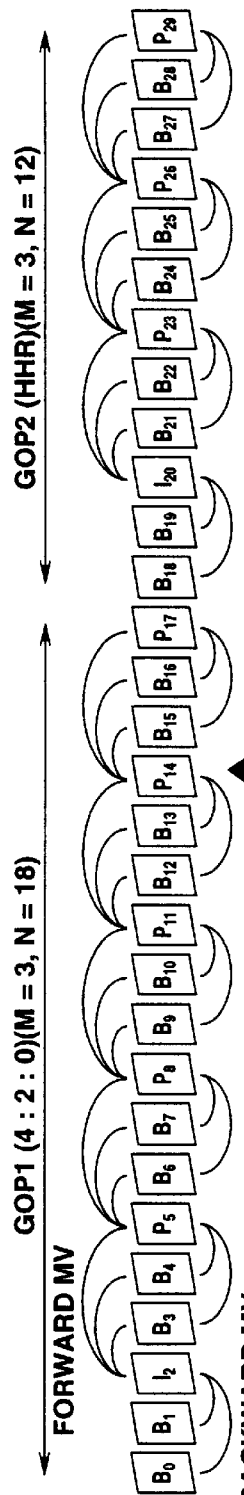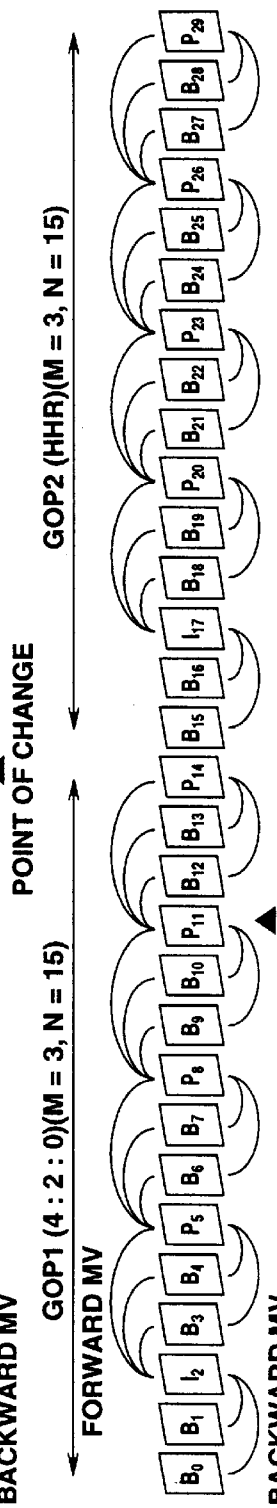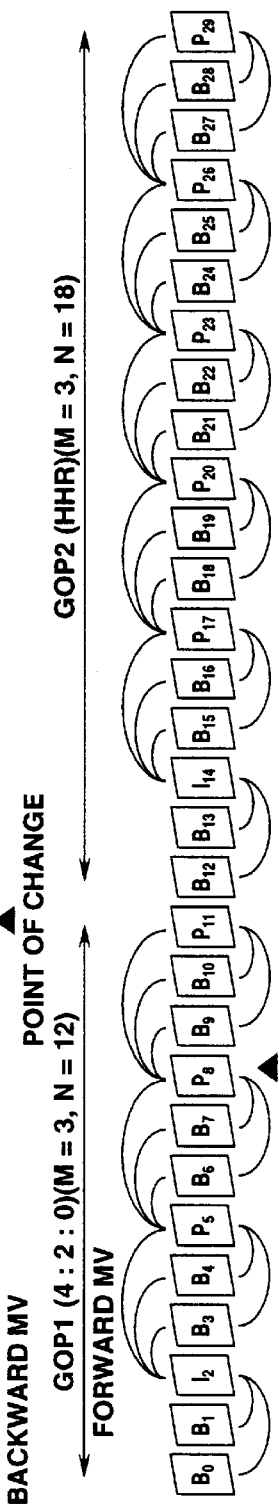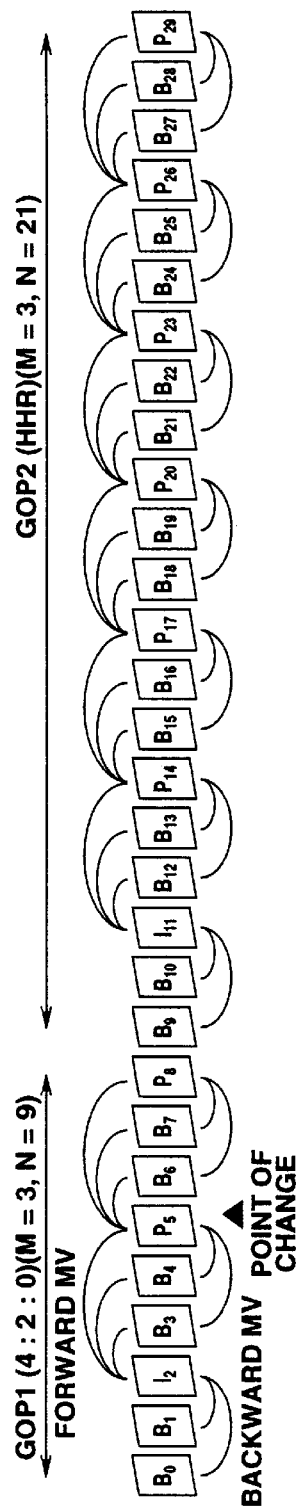

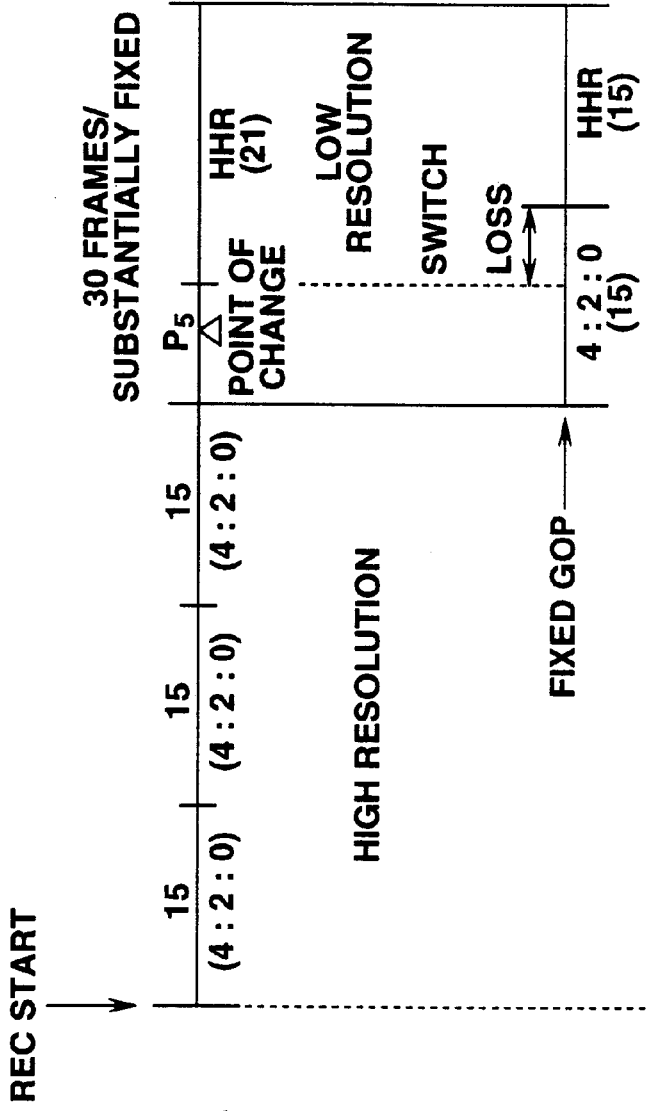

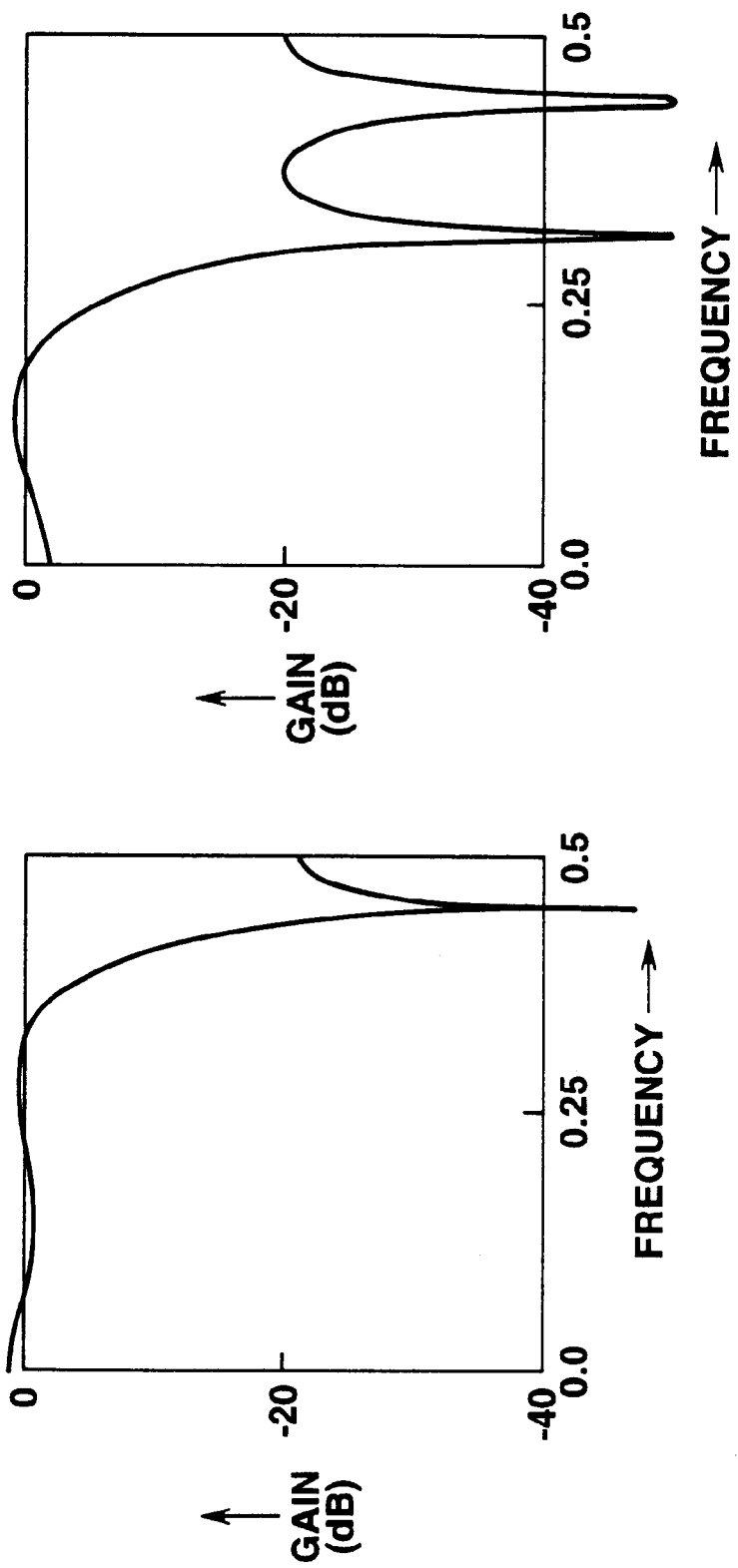

VIDEO SIGNAL PROCESSING APPARATUS AND VIDEO SIGNAL PROCESSING METHOD

BACKGROUND OF THE INVENTION

1. Field of the Invention

This invention relates to a video signal processing apparatus and a video signal processing method adapted to encode moving pictures and efficiently switch resolution and therefore the number of pixels within an image sequence.

2. Description of the Related Background Art

MPEG2 (Moving Picture Experts Group Phase 2) represents a coding system designed for applications including broadcasting and AV equipment and being popularly used as technique for compressing information in the form of pictures, sounds and data.

MPEG2 encodes input data such as video data and audio data as well as other data on the basis of bit rate. As for pictures, it divides a picture into m×n blocks and transforms them by means of orthogonal functions to concentratively exploit the signal power and compress the entire volume of information.

Image data encoded by MPEG2 shows a hierarchical structure extending from a sequence layer down to a block layer.

To be more accurate, a bit stream conforming to the MPEG2 Standards comprises a sequence layer of a group of serially arranged pictures having common attributes, a GOP (group of pictures) layer operating as the smallest unit for a group of pictures adapted to be randomly accessed, a picture layer of common attributes of a picture, a slice layer for information common to small pictures obtained by slicing the screen, a macro-block layer for information common to pixel blocks (macro-blocks) obtained by further dividing the slice layer and a block layer for transform coefficients per se.

The picture layer deals with pictures according to a main level format. In the case of NTSC television signals, for example, a picture is expressed by 704 (H)×480 (V) pixels.

Pictures are categorized as I pictures or intra-coded pictures, P pictures or predictive-coded pictures that are forwardly predictive-coded pictures and B pictures or bidirectionally predictive-coded pictures that are forwardly and backwardly predictive-coded pictures. The GOP layer comprises a plurality of pictures.

SUMMARY OF THE INVENTION

For processing moving pictures according to MPEG2, however, input pictures are coded and then the information generated therefrom is observed over the entire sequence to determine the characteristic aspects of the series of input pictures, which are then used to control the encoding operation and improve the quality of the pictures obtained after the encoding/decoding process.

However, this technique is useless in a real time system where pictures that are arbitrarily input typically by means of a movie digital camera are subjected to a compressed coding process and a rewriting process conducted on a recording medium on a real time basis.

In such a system, it is necessary that a series of moving pictures are compression coded to reflect at least some of the characteristics of the series of pictures in a single real time coding operation.

In view of the above identified problem, it is therefore the object of the invention to provide a video signal processing apparatus and a video signal processing method that can perform a coding operation to reflect the characteristics of a series of moving pictures in a single real time coding process for a system that is required to operate on a real time basis.

According to an aspect of the invention, the above object is achieved by providing a video signal processing apparatus adapted to encode video signals of pictures on a basis of group of a plurality of pictures, characterized by comprising:

input means for receiving input video signals;

specification means for specifying the resolution of said input video signals;

control means for controlling the number of pictures of two temporally adjacent groups of pictures containing a changing point of said specified resolution of video signals to be maintained to a constant value; and coding means for coding said two groups of pictures.

According to another aspect of the invention, there is provided a video signal processing method for encoding video signals of pictures on a basis of group of a plurality of pictures, characterized by comprising steps of:

specifying the resolution of input video signals;

controlling the number of pictures of two temporally adjacent groups of pictures containing a changing point of said specified resolution of video signals to be maintained to a constant value; and coding said two groups of pictures.

According to still another aspect of the invention, there is provided a video signal processing apparatus adapted to encode video signals of pictures on a basis of group of a plurality of pictures, characterized by comprising:

input means for receiving input video signals;

specification means for specifying the resolution of said input video signals;

control means for dividing said pictures into a plurality of regions, weighting each of said regions by the degree of coding difficulty and switching resolution for each group of pictures according to said weighted degree of coding difficulty; and coding means for coding said two groups of pictures.

According to still another aspect of the invention, there is provided a video signal processing method for encoding video signals of pictures on a basis of group of a plurality of pictures, characterized by comprising steps of:

specifying the resolution of input video signals;

dividing said pictures into a plurality of regions, weighting each of said regions by the degree of coding difficulty and switching resolution for each group of pictures according to said weighted degree of coding difficulty; and coding said two groups of pictures according to said resolution.

Thus, when compression coding moving pictures input to a video camera according to the invention, temporally adjacent two GOPs containing a changing point of resolution are made to show a constant number of frames, e.g., 30 frames, so that the bit rate is held substantially to a fixed level within the two GOPs (=30 frames). As a result, a video signal processing apparatus and a video signal processing method according to the invention can easily be applied to a recording/reproducing apparatus using disks for recording/reproducing video signals at a fixed bit rate.

Additionally, when compression coding moving pictures input to a video camera according to the invention, each frame is divided into a number of areas, each of which is weighted by the degree of coding difficulty and the resolution of the input pictures is switched on the basis of the BD values of the weighted areas. Thus, a fixed state of the camera is predicted by taking the fluctuations of the BD values and the values of motion vectors that a sufficiently small in four corners of the screen into consideration. As a result, any local bias of the degree of coding difficulty within the screen can be corrected to switch resolution effectively and efficiently.

BRIEF DESCRIPTION OF THE DRAWINGS

FIGS. 4A–4D are a schematic illustration of combinations of GOPs.

FIGS. 5A–5C are a schematic illustration of a GOP.

FIGS. 10A and 10B show graphs showing the frequency characteristics of resolution converting filters.

DESCRIPTION OF THE PREFERRED EMBODIMENTS

Now, a picture signal processing apparatus and a picture signal processing method according to the invention will be described in greater detail by referring to the accompanying drawings that illustrate preferred embodiments of the invention.

Figure 1:
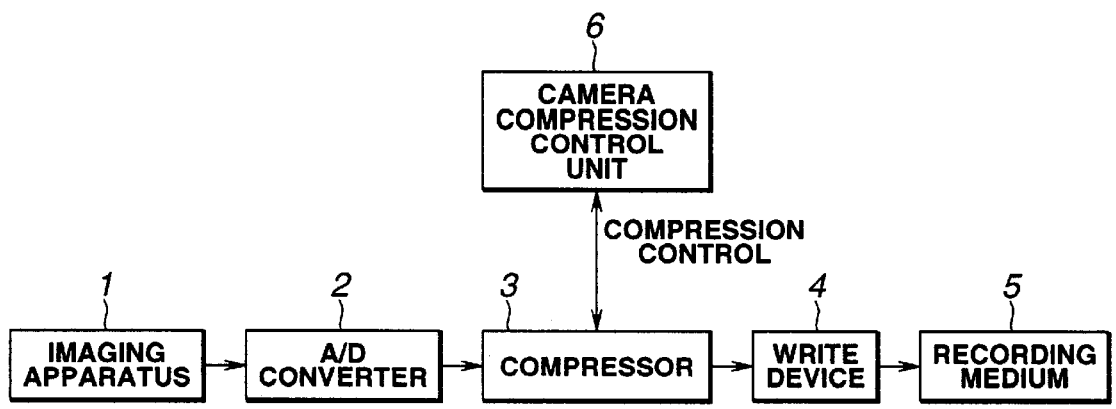
FIG. 1 is a schematic block diagram of a moving picture compression recording apparatus.

FIG. 1 is a schematic block diagram of a moving picture compression recording apparatus realized by applying a picture signal processing apparatus and a picture signal processing method according to the invention that can suitably be used for a digital video camera.

Referring to FIG. 1, imaging apparatus 1 is designed to pick up an image of a given object and output picture signals for the image. A/D converter 2 converts the picture signals from the imaging apparatus 1 into digital video signals and supplies the latter to compressor 3 and camera compression control unit 6. The compressor 3 encodes the video data from the A/D converter and supplies the coded bit stream to write device 4 and information on motion vectors to camera compression control unit 6.

The write device 4 writes the bit stream of the coded picture data fed from the compressor 3 onto a recording medium 5, which may be a magnetic tap, a magnetic disk, an optical disk, an opto-magnetic disk or a semiconductor memory.

The camera compression control unit 6 controls the exchange of encoding parameters mainly with the compressor 3 and also the start and the end of operation of recoding data of the write device 4.

A moving picture compression recording apparatus as shown in FIG. 1 can be applied not only to a digital video camera adapted to record/reproduce images typically by means of an accumulation medium but also to a digital still camera for taking still pictures.

Figure 2:
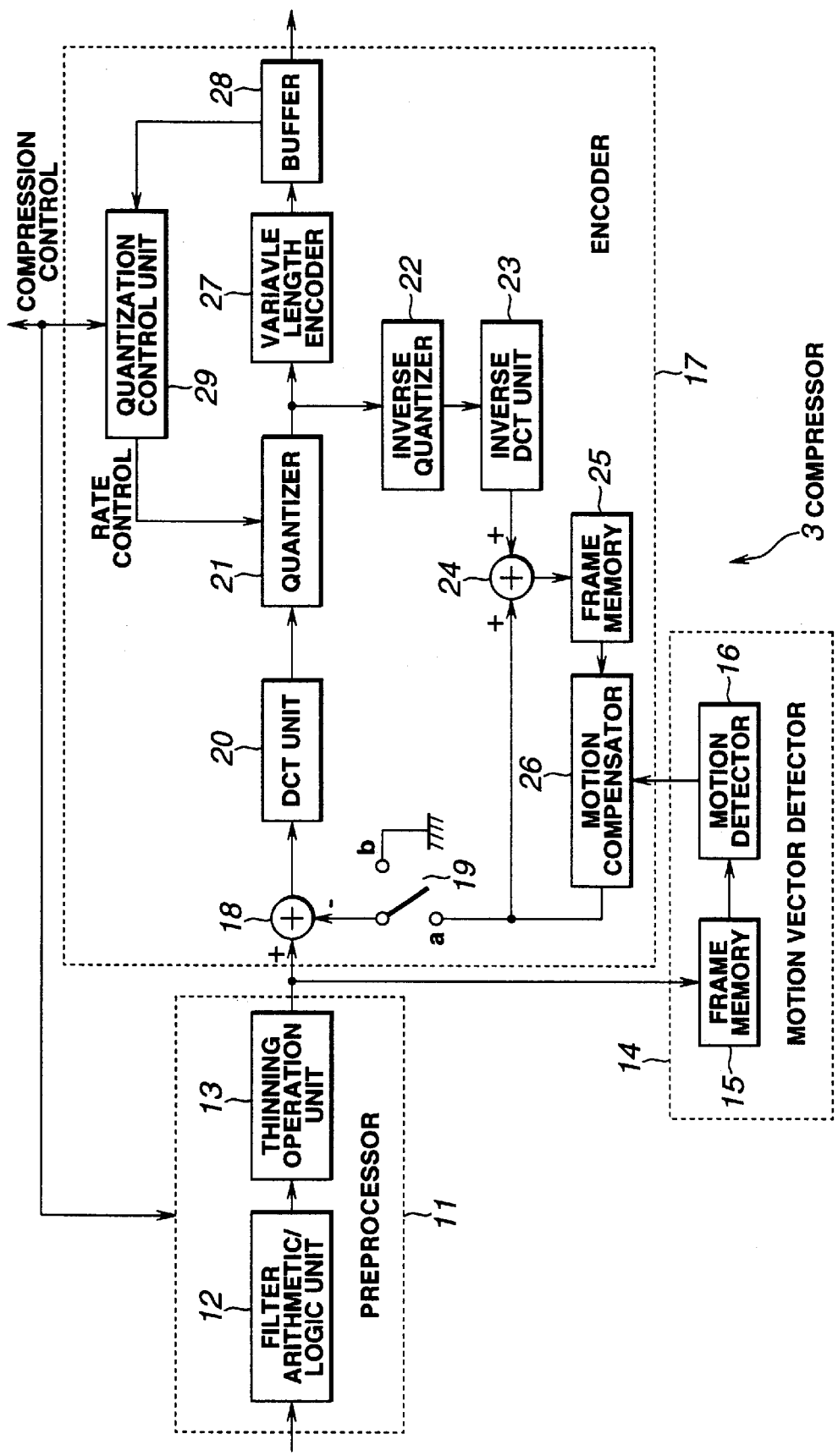
FIG. 2 is a schematic block diagram of the compressor of FIG. 1.
Figure 3A:
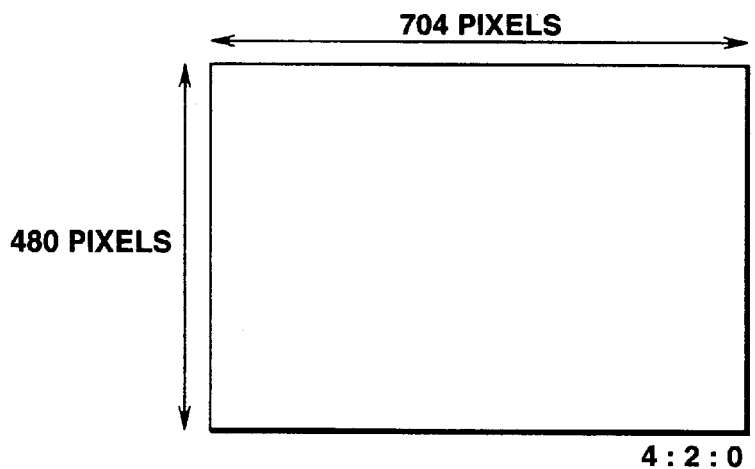
FIGS. 3A–3D are a schematic illustration of conversion of number of pixels.
Figure 3B:
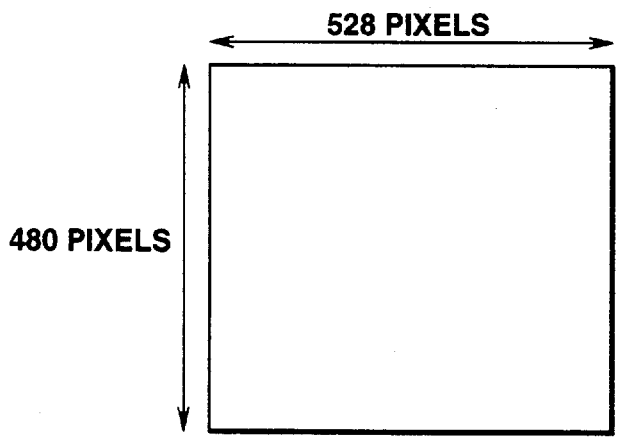
Figure 3C:
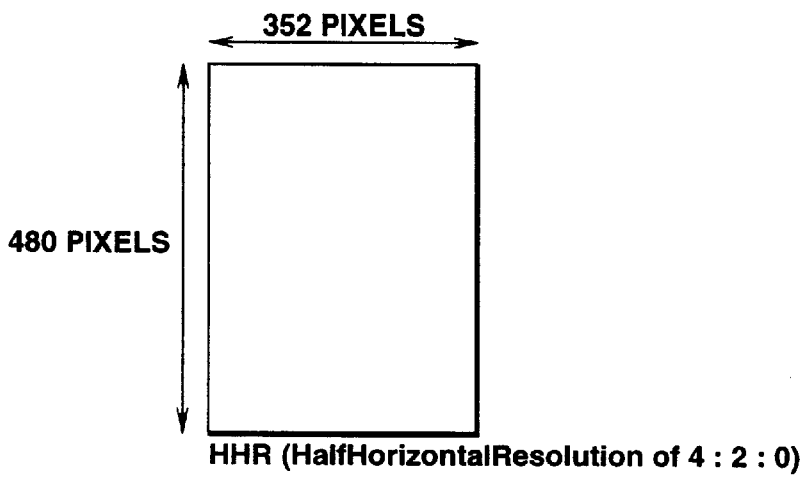
Figure 3D:
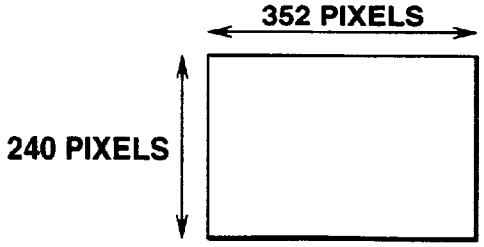

FIG. 2 is a schematic block diagram of the compressor 3 of the moving picture compression recording apparatus of FIG. 1 illustrated in greater detail.

The compressor of FIG. 2 comprises a preprocessor 11 that performs an operation of appropriately converting resolution or shifting the number of pixels for input, a motion vector detector 14 for detecting the extent of motion from a frame to the next and an encoder 17 for encoding and generating bit streams.

The preprocessor 11 includes a filter arithmetic/logic unit for shifting the number of pixels or the frequency good for the picture to be coded according to the compression control signal from the camera compression control unit 6 and a thinning operation unit 13 for actually shifting the number of pixel or changing the number of samples.

The motion vector detector 14 includes a frame memory 1 for temporarily storing picture data and a motion detector for detecting motion vectors forwardly and backwardly from a frame to the next. Thus, the motion vector detector 14 detects any motion vector or the amount of motion from a frame to the next on the basis of the picture data coming from the preprocessor 11 and supply it to the encoder 17.

The encoder 17 encodes the picture data from the preprocessor 11 according to the motion vector fed from the motion vector detector 14 and supplies the obtained bit stream to the write device 4 of FIG. 1. More specifically, the encoder 17 has a discrete cosine transform (DCT) unit 20 that performs an operation of discrete cosine transform on the picture data fed to it by way of adder 18 and supplies the obtained data to quantizer 21. The quantizer 21 performs a quantizing operation on the picture data from the DCT unit 20 and supplies the obtained data to variable length encoder 27 and inverse quantizer 22.

The inverse quantizer 22 performs a inverse quantizing operation on the quantized picture data fed from the quantizer 21 and feeds inverse DCT unit 23 with the obtained data. The inverse DCT unit 23 performs an operation of inverse DCT on the inversely quantized picture data from the inverse quantizer 22 and supplies the obtained data to adder 24. The adder 24 adds the picture data from the inverse DCT unit 23 and the compensated picture data from compensator 26, which will be described hereinafter, and feeds frame memory 25 with the obtained data.

The frame memory 25 stores the picture data from the adder 24 and then supplies them to motion compensator 26. The motion compensator 26 performs an operation of motion compensation on the picture data from the frame memory 25 and supplies the obtained data to the adder 24 and also to the adder 18 by way of switch 19.

Variable length encoder 27 performs an operation of variable length coding on the picture data from the quantizer 21 and supplies the obtained data to buffer 28. The buffer temporarily stores the picture data from the variable length encoder 27 and then supplies them to quantization control unit 29. It also feed the quantizer 21 with a rate control signal for controlling the rate of quantization according to the compression control signal from the camera compression control unit 6.

Now, the operation of the compressor 3 will be discussed below. The video signal that represents the picture of an object taken by the imaging device 1 is converted to digital picture data by the A/D converter 2, which are then fed to the compressor 3.

The picture data supplied to the compressor 3 are input to the preprocessor 11 of the compressor 3. The filter arithmetic/logic unit 12 of the preprocessor 11 modifies the frequency characteristics ofthe input picture data including the resolution and the number of pixels according to the compression control signal from the camera compression control unit 6. The picture data fed to the thinning operation unit 13 are subjected to an operation of the unit of changing the number of pixels and hence that of samples that is adapted to the input picture data according to the compression control signal and the obtained data are fed to the encoder 17 and the motion vector detector 14.

The picture data fed from the thinning operation unit 13 of the preprocessor 11 to the motion vector detector 14 are temporarily stored in the frame memory 15 of the motion vector detector 14. Then, the picture data stored in the frame memory are read out by the motion detector 16 of the motion vector detector 14 and motion vectors from a frame to the next are detected both forwardly and backwardly. The motion vectors detected by the motion vector detector 14 are then supplied to the motion compensator 26 of the encoder 17.

On the other hand, the picture data that have been compensated for motion and fed from the motion compensator 26 by way of the switch 19 are subtracted from the picture data supplied from the thinning operation unit 13 of the preprocessor 11 to the encoder 17 and then the obtained data representing the difference are fed to the DCT unit 20. The picture data fed to the DCT unit 20 are subjected to an operation of discrete cosine transform and fed to the quantizer 21. The picture data fed to the quantizer 21 are subjected to a quantizing operation and then fed to the variable length encoder 27 and the inverse quantizer 22.

The picture data fed to the inverse quantizer 22 are then subjected to a inversely quantizing operation of the inverse quantizer 22 and then to an operation of inverse DCT of the inverse DCT unit 23 for restructuring the picture data. The restructured picture data are then added to the picture data of the reference frame fed from the motion compensator 26 that have been restructured before they are fed to and stored in the frame memory 25. The picture data stored in the frame memory 25 are then read out by the motion compensator 26 and subjected to an operation of motion compensation according to the motion vectors detected by the motion vector detector 14.

The picture data that have been subjected to an operation of motion compensation are then supplied to the adder 18 as the switch 19 is turned to terminal a in the operation mode where the restructured picture data are encoded between a frame and the next. Then, in the adder 18, the picture data fed from the motion compensator 26 by way of the switch 29 are subtracted from the picture data fed from the motion compensator 11. In the operation mode where picture data are encoded within a frame, the switch 19 is turned to terminal b and a data having a value of 0 is fed to the adder 18.

The bit stream output from the variable length encoder 27 is supplied to the write device 4 of FIG. 1 by way of the buffer 28. The bit rate of the operation of quantization conducted in the quantizer 21 is controlled by the quantization control unit 29 by controlling the quantization parameters of the quantizer 21 according to the buffer volume of the buffer 28 and the command for quantization from the camera compression control unit 6 shown in A of FIG. 1.

An input video signal of a digital video camera having a configuration as described above is typically constituted by a so-called 4:2:0 frame having 704 (horizontal)×480 (vertical) pixels.

Such a 4:2:0 frame contains 44 (horizontal)×30 (vertical) macro-blocks obtained by dividing the frame, each having a size of 16 pixels×16 pixels. In other words, a frame comprises a total of 1,320 macro-blocks, A series of moving pictures will be input at a rate of 30 frames per second.

Alternatively, a type of frame having 528 (horizontal)× 480 (vertical) pixels as shown in B of FIG. 3, a so-called 4:2:0 frame having 352 (horizontal)×480 (vertical) pixels as shown in C of FIG. 3, which is referred to as HHR (half horizontal resolution of 4:2:0) because the resolution of the frame is equal to a half of a frame with 704 horizontal pixels, or a type of frame having 352 (horizontal)×352 (vertical) pixels as shown in D of FIG. 3 may be used for the purpose of the invention.

Note that the frame can be switched from a type to another according to varying pictures.

Now, a first embodiment of the invention will be described. This embodiment is adapted to switch its resolution by using combinations of frames such as 18+12, 15+15, 12+18 and 9+21 so that the sum of the frames of a pair of GOPs containing a resolution changing point and arranged temporally adjacent is always made equal to 30 in view ofthe value of the block difference (DF) that is the difference of the motion vectors obtained by an operation of sequential compression and compensated for motion when compression encoding and recording the moving pictures input by a moving picture compression recording apparatus such as a video camera as described above.

Generally, an abrupt change does not necessarily occur at the boundary of two adjacent GOPs if the number of frames is fixed for all GOPs. Therefore, if a motion is processed at the end of the GOP where a motion occurred, noise can become remarkable in the frames of the GOP between the frame where the motion starts and the end of the GOP particularly when the GOP shows a high resolution. On the other hand, if the next GOP is inserted irregularly each time an abrupt change of the scene is detected by four P pictures in a GOP, the bit rate can rise unintendedly and undesiredly.

To avoid these problems, a total of four combinations of two GOPs with different numbers of frames including a combination of 18+12 frames as shown in A of FIG. 4, that of 15+15 frames as shown in B of FIG. 4, that of 12+18 frames as shown in C of FIG. 4 and that of 9+12 frames as shown in D of FIG. 4 are used in this embodiment.

It will be seen that A through D of FIG. 4 show four different combinations of a pair of GOPs with different numbers of frames. In FIG. 4, reference symbol "I" denotes an I picture, or an intra-coded picture, "P" denotes a P picture, or a predictive-coded picture that is a forwardly predictive-coded picture and "B" denotes a B picture or a bidirectionally predictive-coded picture that is a forwardly and backwardly predictive-coded picture. In FIG. 4, the numerals affixed to the "Is", "Ps" and "Bs" denote the respective orders of arrangement of the frames.

Referring to B of FIG. 5, a basic GOP (M=3, N=15) comprises 15 frames, where M represents the number of frames, at every which a P picture appears and N represents the number of frames of the GOP. When a same resolution is maintained, GOPs comprising 15 frames will continue.

When an abrupt change is detected in $P_5$ and the high resolution of 4:2:0 is switched to the low resolution of HHR (half horizontal resolution of 4:2:0) after the ninth frame (N=9) as shown in D of FIG. 4, a quick switch of resolution can be realized in response to the change in $P_5$. Then, the GOP1 containing 9 frames is combined with GOP2 containing 21 frames.

If, on the other hand, GOPs with a fixed number of frames of 15 as shown in B of FIG. 5 are used, the operation of suppressing the block noise by lowering the resolution to HHR is realized only after the end of the fifteenth frame so that the encoder goes on producing six noisy frames to response belatedly to the abrupt change in $P_5$.

Similarly, when an abrupt change is detected in $P_{14}$ and the high resolution of 4:2:0 is switched to the low resolution of HHR after the eighteenth frame (N=18) as shown in A of FIG. 4, the GOP1 containing 18 frames is followed by GOP2 containing 12 frames.

Similarly, when an abrupt change is detected in $P_8$ and the high resolution of 4:2:0 is switched to the low resolution of HHR after the twelfth frame (N=12) as shown in C of FIG. 4, the GOP1 containing 12 frames is combined with COP 2 containing 18 frames.

As seen from the above description, the first embodiment is adapted to combine a high resolution GOP with N=9, 12 or 18 and a low resolution GOP with N=21, 18 or 12 only when a high resolution is switched to a low resolution. Note that a high resolution GOP as used herein refers to a GOP of frames with a high resolution such as 4:2:0, whereas a low resolution GOP refers to a GOP of frames with a low resolution such as HHR.

Thus, it will be seen that the number of frames of the GOPs immediately before and after the point of resolution switching is always 30 and only the positions of the I pictures are shifted in the above operation to make the operation very simple.

Additionally, a substantially fixed bit rate can be realized in the two GOPs by making the number of bits of each frame proportional to the number of frames of each picture type. This will be a great advantage of disk-shaped recording/reproducing devices adapted to record and reproduce data at a fixed bit rate.

Assuming that an I picture, a P picture and a B picture respectively comprise 400 kbits, 200 kbits and 80 kbits, two GOPs having a total of 30 frames as described above will show a bit rate as described below.

If two GOPs respectively have 18 and 12 frames as shown in A of FIG. 4, the number of generated bits will be 2.36 Mbits+1.64 Mbits and the bit rate will be 3.93 Mbps+4.1 Mbps to show an average bit rate of 4 Mbps.

If two GOPs respectively have 15 and 15 frames as shown in B of FIG. 4, the number of generated bits will be 2 Mbits+2 Mbits and the bit rate will be 4 Mbps+4 Mbps to show an average bit rate of 4 Mbps.

If two GOPs respectively have 12 and 18 frames as shown in C of FIG. 4, the number of generated bits will be 1.64 Mbits+2.36 Mbits and the bit rate will be 4.1 Mbps+3.93 Mbps to also show an average bit rate of 4 Mbps.

If two GOPs respectively have 9 and 21 frames as shown in D of FIG. 4, the number of generated bits will be 1.28 Mbits+2.72 Mbits and the bit rate will be 4.27 Mbps+3.89 Mbps to show again an average bit rate of 4 Mbps.

Now, the operation of switching resolution will be discussed further by referring to FIG. 5.

A in FIG. 5 illustrates a situation where, after 3 consecutive GOPs from the start of a recording operation (Rec Start), each comprising 15 frames to provide a high resolution of 4:2:0, an abrupt change is detected in $P_5$ of the fourth GOP of the picture so that the fourth GOP with a high resolution of 4:2:0 is terminated at the 9th frame (N=9) and switched to another GOP with a low resolution of HHR, which is the fifth GOP. Thus, since the fourth GOP containing $P_5$ comprises 9 frames, the GOP immediately succeeding the fourth GOP is made to have 21 frames to make the total number of frames of the two GOP equal to 30.

On the other hand, B in FIG. 5 illustrates GOPs with a fixed number of frames. In this case, if an abrupt change is detected in $P_5$ of a GOP, resolution switching takes place only at the end of the GOP comprising 15 frames. Thus, the switching operation responding to the abrupt change in $P_5$ is delayed by 6 frames from the corresponding switching operation of A in FIG. 5, where the bit rate is substantially fixed, because all GOPs are sized identically.

C in FIG. 5 illustrates an arrangement where every two GOPs are used as a completely fixed unit of 30 frames. Such an arrangement may be desired to achieve a target bit rate by fixing the number of frames of any two consecutive GOPs to 30 frames when writing data onto a disk.

In this case, the arrangement that every two GOPs are used as a completely fixed unit of 30 frames has to be maintained when responding to an abrupt change in the picture. To the contrary, the arrangement of GOPs shown in A of FIG. 5 is not completely fixed because a GOP comprising 9 frames may follow a GOP with 15 frames.

Referring to C of FIG. 5, the third 30 frames divided into a GOP having 12 frames with a high resolution of 4:2:0 and another GOP having 18 frames with a low resolution of HHR in order to respond to an abrupt change in the picture.

Now, the operation of the camera compression control unit of the above embodiment will be described.

Figure 6:
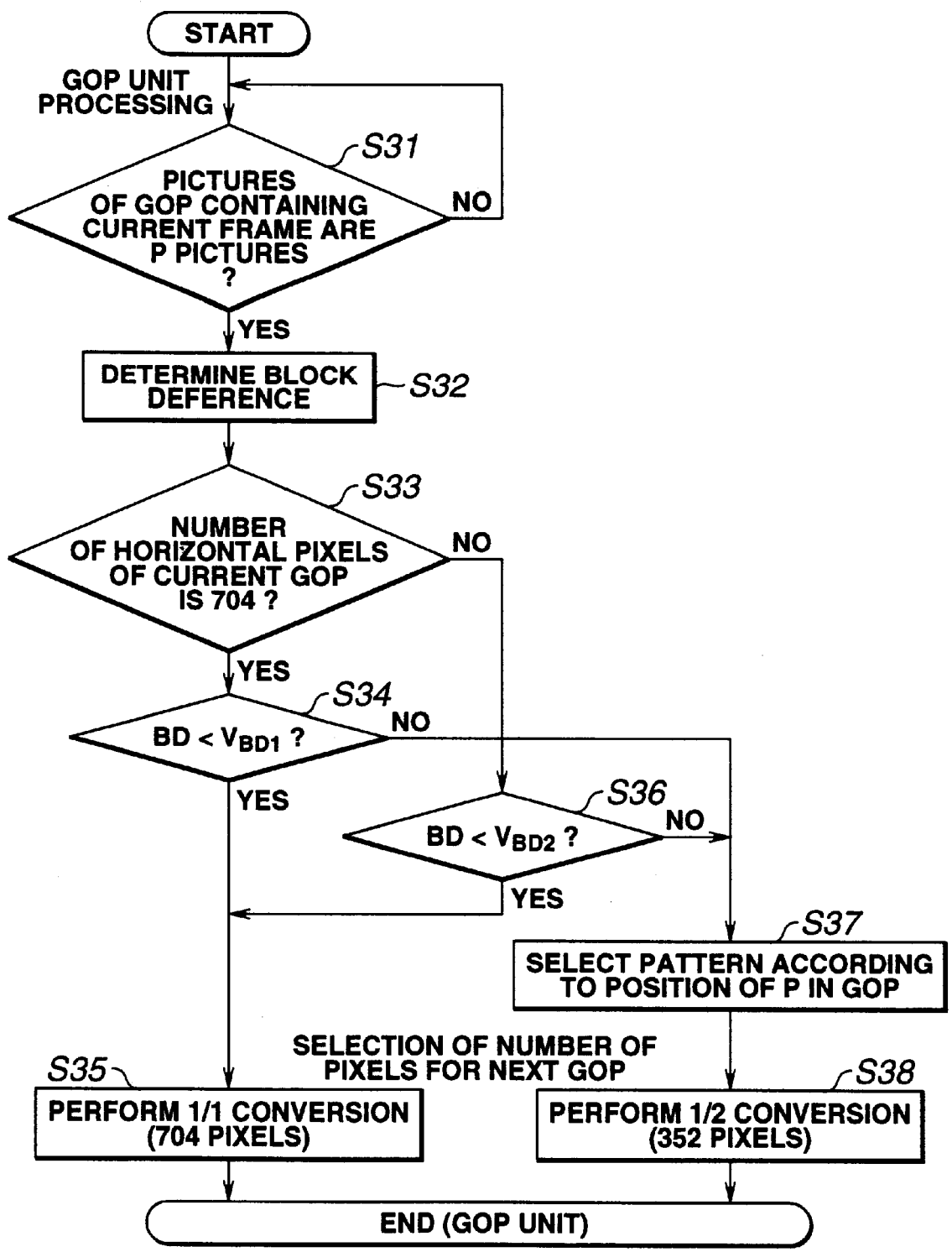
FIG. 6 is a flow chart of the operation of selecting a resolution for the purpose of the invention.

FIG. 6 is a flow chart of the operation of selecting a resolution for the above embodiment.

Referring to FIG. 6 illustrating the operation of handling GOPs for the above embodiment, the control unit determines in Step S31 if the picture of the GOP containing the frame that is currently being processed represents a P picture or not and, if the answer to this question is yes, it performs an arithmetic operation of determining the block difference (BD) value in Step S32. Although a block difference value will be discussed in greater detail hereinafter, it will be briefly described right below.

A block difference value refers to the absolute value of the difference of macro-blocks when a motion is compensated by means of a motion vector determined for each macro-block obtained by dividing a P picture by 16 pixels both in the horizontal direction and the vertical direction.

In Step S33, the control unit determines if the number of pixels of the current GOP is horizontally 704 arranged for a high resolution or 352 arranged for a low resolution. If it determines that the number of pixels is 704 and hence the answer in this step is yes, it proceeds to Step S34. On the other hand, if the answer to the question is no, it proceeds to Step S36.

In Step S34, the control unit determines if the obtained BD value is smaller than a reference BD value of $V_{BD1}$ or not. If the answer is yes, it proceeds to Step S35, where it selects 704 for the number of pixels of the next GOP which is same as that of the current GOP (1/1 transform). If the answer is no, on the other hand, it proceeds to Step S37.

In Step S37, the control unit selects a resolution pattern according to the position of the P picture within the GOP. More specifically, it selects one of the frames shown in FIG. 3. In the subsequent step of Step S38, it switches to 352 pixels with a low resolution (1/2 transform).

If, on the other hand, the answer in Step S33 is no and the number of pixels of the current GOP represents a low resolution mode, the control unit proceeds to Step S36, where it determines if the obtained BD value is smaller than another reference BD value of $V_{BD2}$ or not.

If it is determined in Step S36 that the BD value is smaller than the reference value (Yes), the control unit moves to Step S35, where it selects 704 for the number of pixels of the next GOP (1/1 transform. If it is found in Step S36 that the BD value is greater than the reference value (No), the control unit proceeds to Step S37.

Thus, the above described algorithm is used for the first embodiment in order to maintain a substantially fixed bit rate within every two GOPs (=30 frames).

As discussed above, the first embodiment for compression coding moving pictures input to a moving picture compression recording device such as a digital video camera is adapted to switch resolution by controlling a GOP immediately preceding any changing point of resolution and a GOP immediately succeeding the changing point so as to make the two GOPs always contain a total of 30 frames on the basis of the motion vector obtained as a result of sequential compressions and the BD value representing the difference produced after compensating the motion. In other words, the number of frames of any temporally adjacent GOPs are made to have 30 frames to achieve a target bit rate.

To make two GOPs have 30 frames, combinations of 18+12, 15+15, 12+18 and 9+21 are used for the purpose of resolution switching.

Now, a second embodiment of the invention will be described below.

As a first example, this second embodiment may be so designed that, when compression coding and recording moving pictures input to a moving picture compression recording device such as a digital video camera, each frame is divided into a number of areas, each of which areas is then weighted as a function of coding difficulty and the resolution of the input picture is switched on the basis of the BD values of the weighted areas.

Figure 7:
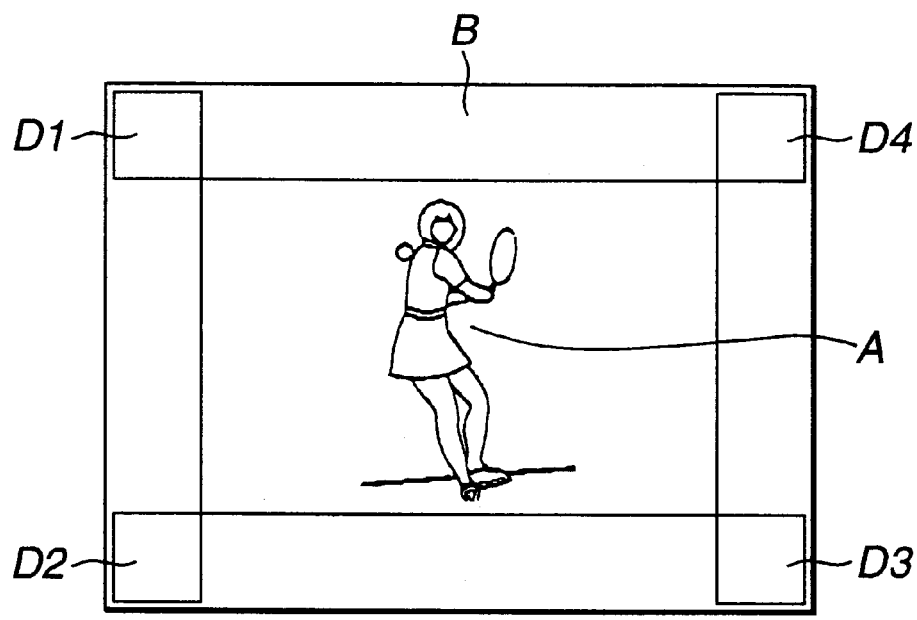
FIG. 7 is a schematic illustration of weighting different areas of a frame according to the coding difficulty of each area.

FIG. 7 shows an example of areas obtained by dividing a frame, of which four corner areas D1, D2, D3 and D4 will be monitored. Then, a fixed state of input of the camera device will be predicted when the BD values and the vector values of the four corner areas D1, D2, D3 and D4 of the screen are sufficiently small so that unnecessary operations of switching the resolution for almost nothing may successfully be eliminated.

Also referring to FIG. 7, as a second example, the embodiment may be so designed that each frame is divided into peripheral sections B and a central section A, which are then weighted differently also as a function of coding difficulty. In other words, an abrupt motion is detected not from the BD value of the entire frame but by taking the distribution of motion within the frame into consideration to control the resolution effectively and efficiently. Then, local deviations of coding difficulty that can be observed rather frequently can be corrected efficiently with this arrangement.

Figure 8:
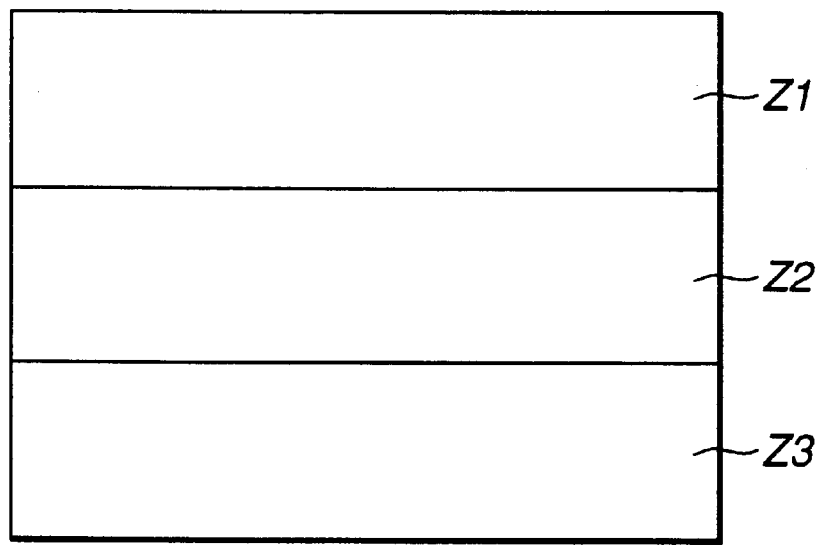
FIG. 8 is a schematic illustration of weighting horizontal zones of a frame according to the coding difficulty of each zone.

FIG. 8 shows a still another example of areas obtained by dividing a frame for this embodiment and including a top Z1 area and lower Z2 and Z3 areas occupying the lower ⅔ of the frame, which are more heavily weighted for coding difficulty than the top area of Z1. This arrangement is base on that, when the camera device is held by hands horizontally, an lower portion of the camera device can move more remarkably than an upper portion due to the effect of gravity.

Assume, for example, that the camera device is shooting a water skier. An upper portion of the frame may often take mountains and sea water that are substantially stationary, while a lower portion of the frame may take the rapid motion of the skier. Then, the lower portion of the frame may show a large BD value to make the obtained picture rather noisy. This problem can be avoided by weighting the lower portion heavily so as to reduce the resolution when the lower portion of the frame shows a large BD value.

More specifically, when a lower portion of the frame shows a dense distribution of large BD values if compared with an upper portion of the frame, noise can become remarkable in the lower portion where a rapid motion appears if the quantizer scale is updated sequentially from the upper left macro-block to the lower right macro-block of the frame. When taking such a picture with this embodiment, the resolution is reduced if the BD value of the entire frame is not large but the BD value distribution shows a large deviation within the frame. In this way, the operation of resolution switching can be conducted effectively and efficiently.

As described above, the second embodiment is so designed that, when compression coding and recording moving pictures input to a moving picture compression recording device such as a digital video camera, each frame is divided into a number of areas, each of which areas is then weighted as a function of coding difficulty and the resolution of the input picture is switched on the basis of the BD values of the weighted areas.

Then, it may be so arranged that unnecessary operations of switching the resolution for almost nothing are eliminated by predicting a fixed state of input of the camera device by taking that the four corner areas of the frame shows small BD values and small motion vector values into consideration.

It may alternatively be so arranged that the peripheral areas of the frame are less heavily weighted than the central area for coding difficulty or that the lower ⅔ portion of the frame is more heavily weighted than the upper ½ portion of the frame.

Thus, the above embodiment represents a technique of handling different resolutions in a sequence of moving pictures as in a video sequence according to MPEG2 and recording the sequence of moving pictures on and reproducing them from a disk-shaped recording/reproducing device.

Now, an example suitable for applying the above embodiment to a moving picture compressing device such as a digital video camera will be discussed below. In this example, a predictive operation is conducted before an encoding operation in order to optimally control an imaging operation.

A moving picture compressing device such as a digital video camera to be used for this example differs from the one illustrated in FIG. 1 in that the camera compression control unit 6 determines values for the parameters (e.g., the filter coefficients as will be described hereinafter and the number of pixels) necessary for coding appropriately the data fed from the A/D converter 2 according to the information from the compressor 3 and supplies them to the compressor as compression control signals along with recording control signals for controlling the write device for the start and the end of recording data. Otherwise, the moving picture compressing device is identical with that of FIG. 1.

Figure 9:
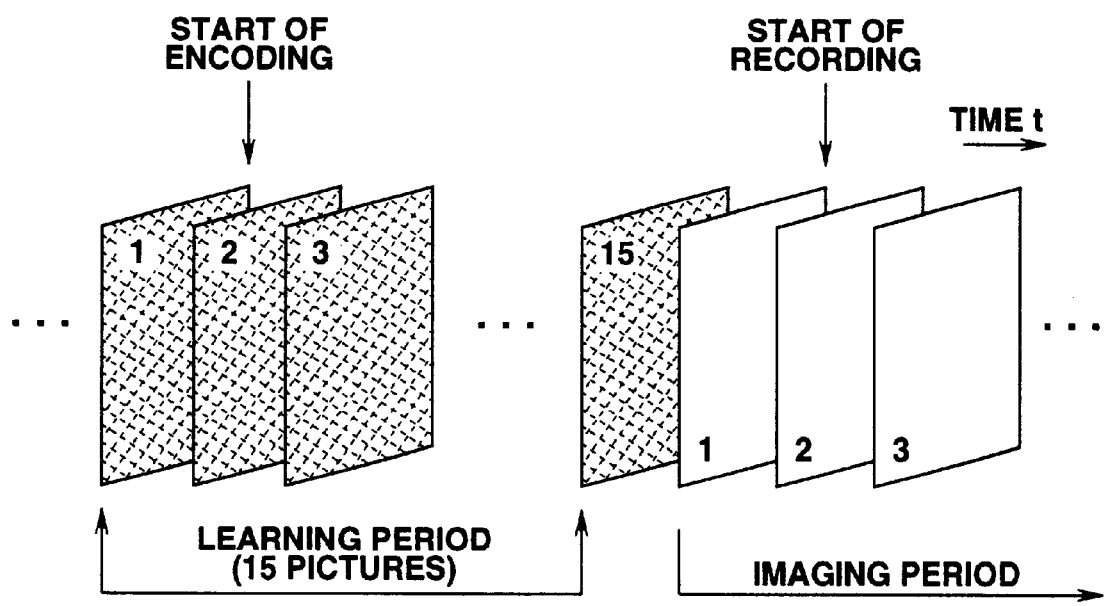
FIG. 9 is a schematic illustration of timing of processing pictures.

In this example, the operation of recording a bit stream of compression coded data on the recording medium 5 does not start the instant when the switch of the moving picture compressing device such as a digital video camera is operated. In other words, as shown in FIG. 9, the input pictures of the first 15 frames are tentatively compression coded and then values are selected for the parameters to be employed for the operation of compression coding the pictures actually taken immediately after the 15 frames (or, typically 0.5 seconds after the operation of the switch), by using the volume of the generated codes (the number of bits of the bit stream) and other data so that the compression coding operation is conducted on the basis of the parameters to start the operation of recording the generated bit stream on the recording medium 5.

More specifically, in the step of tentative compression coding, a quantization control operation that is normally conducted on a frame by frame basis or a macro-block by macro-block basis does not take place in a dynamic sense of the words. In stead, a compression coding operation is conducted by using a quantization coefficient that is held to a constant value and the volume of codes generated in this operation is measured. Then, the coding parameters to be used for encoding the series of moving pictures that are actually taken are determined by utilizing the estimated characteristic values of the obtained result such as the level of difficulty with which the series of moving pictures are compressed.

It will be appreciated that a virtual 2-path encoding can be realized on a real time basis by means of the above described embodiment. In other words, on the basis of the result obtained by extracting characteristic aspects of a series of moving pictures input immediately prior to the actual imaging/recording operation, a detailed coding process can be assigned to the pictures to be actually taken immediately thereafter. Thus, the degree of degradation of the pictures due to companding can be significantly reduced.

In a movie digital camera realized by applying the present invention, any series of moving pictures to be taken in a single recording operation is free from a phenomenon of unpleasant disruptive termination of an image referred to as "scene change" that can be observed in ordinary movies films and TV programs. In other words, each scene can be subjected to an effective compression coding operation by optimizing the parameters of compression coding for the pictures to be taken. Conversely, any large change in the input image that can take place within a shot due to panning, tilting, zooming and/or shaking of camera can appropriately be dealt with on a real time bases.

As shown in FIG. 9, the series of pictures of 15 frames that are to be tentatively coded will be compression coded without being written on the recording medium 5 shown in FIG. 1. At this stage, the camera compression control unit 6 does not issue a write start command to the write device 4. As for the compressor 4, it selects a learning mode for the quantization control operation and does not determine the target number of bits per frame nor per macro-block for the encoder 17. Besides, it causes the preprocessor 11 to maintain the number of pixels and the frequency characteristics of each frame of the input pictures to estimate the potential volume of information the frame by observing the bit stream.

Then, when pictures are actually taken, the camera compression control unit 6 analyzes the outcome of the tentative coding operation and the preprocessor 11 selects the resolution and parameters for converting the number of pixels. For example, the resolution can be changed by using a digital filter and controlling the transmission band of frequencies to change the filter coefficients of the digital filter as shown in FIG. 10 and the number of pixels can be shifted by thinning pixels at least horizontally or vertically as shown in FIG. 4.

FIG. 10 shows graphs showing the frequency characteristics of resolution converting filters. In the graphs of FIG. 10, the horizontal axes represent frequency and the vertical axes represent gain. The graph A in FIG. 10 shows a filter adapted to pass all frequencies, whereas the graph B in FIG. 10 shows a filter adapted to remove high frequency components from a picture having such high frequency components to a large extent.

The picture signal that has been preprocessed in this way is then supplied to the motion vector detector 14 and the encoder 17.

The motion vector detector 14 determines the amount of motion of each macro-block between frames in the forward direction and the backward direction in terms of the temporal arrangement of frames. In other words, an optimal value is arithmetically determined for each motion vector by means of a block matching technique and the obtained value is stored.

Figure 11A:
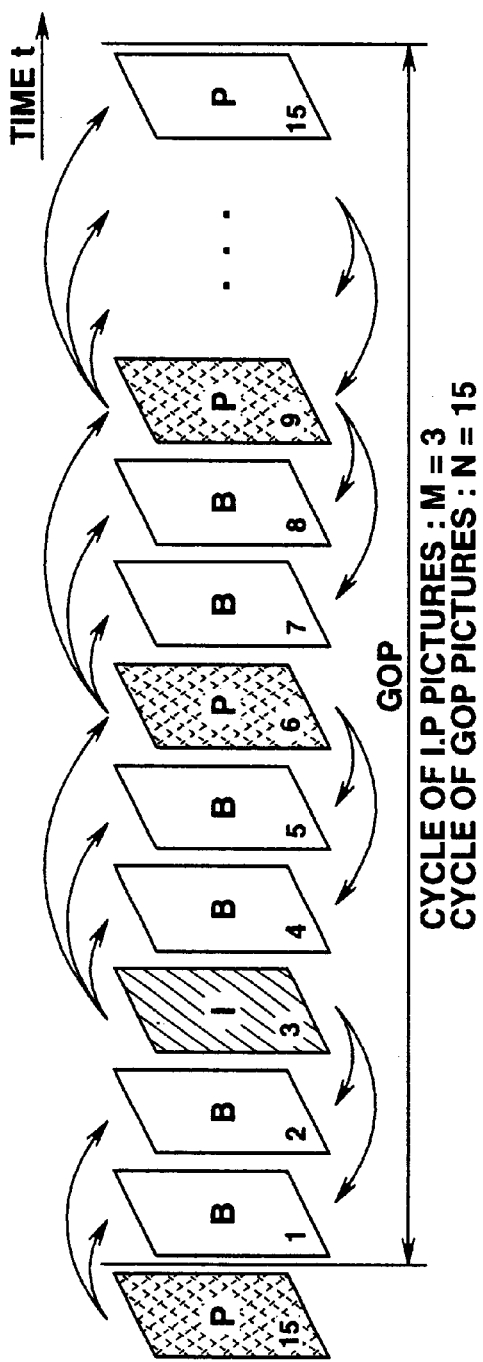
FIGS. 11A and 11B are a schematic illustration of predicted directions of motion and the GOP structure.
Figure 11B:
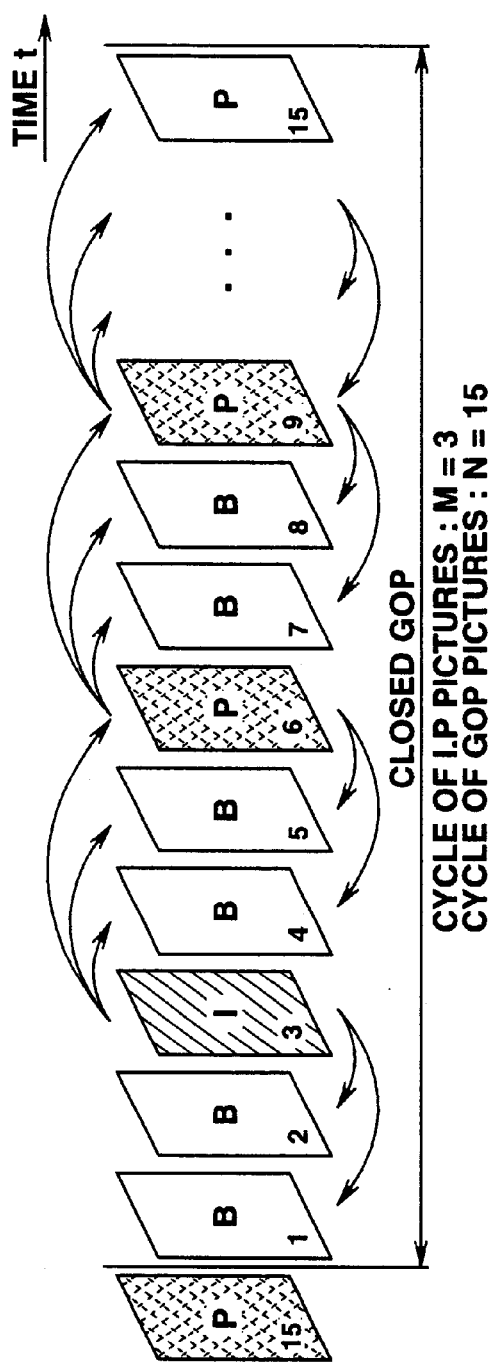

Referring to A of FIG. 11, generally, frames to be subjected inter-frame coding are divided into P pictures that are forwardly predictive and B pictures that are both forwardly and backwardly predictive by predicting the amount of inter-frame motion for determining the motion vector, whereas frames to be subjected intra-frame coding are referred to as I pictures. In both A and B of FIG. 11, which will be described hereinafter, I and P pictures appear at every third frame (M=3) and the number of picture of each GOP (group of picture) is fifteen (N=15).

As seen from B in FIG. 11, if the number of pixels is so shifted as to produce a series of pictures where at least every other GOP has a different number of pixels in an operation of shifting the number of pixels carried out by the preprocessor 11, forward prediction is not used for the B pictures located between the end of a GOP and the first I picture of the next GOP and they are just subjected to inter-frame forwardly-predictive coding to produce a GOP structure generally referred to as closed GOP.

The encoder 17 then compensates the motion by using the motion vector fed from the motion vector detector 14 to reduce the redundancy of data on the time base. It also reduces the redundancy of data by means of a DCT from the space base to the frequency base and then weights the obtained data on the frequency base, which are subsequently quantized.

At this stage, the quantization control unit 29 operates to reflect the command from the camera compression control unit 6. At the same time, it carries out a processing operation of inverse quantization and that of inverse transform to compensate the motion. Then, the variable length encoder 27 performs a variable length encoding operation to obtain a bit stream as the final step.

The above compression coding process includes a step of measuring and analyzing the number of bits, the motion vector and the intra-block difference after the motion compensation generated in a learning mode by means of the camera compression control unit 6 to predict the characteristics of the series of pictures to be taken. In addition to the learning step prior to actual imaging, the camera compression control unit 6 can constantly observe the characteristics of the series of pictures being taken to successively predict the next GOP or the next frame.

Now, the operation of the camera compression control unit 6 during the learning step of this embodiment will be discussed in greater detail. As shown in FIG. 9, each of the initial 15 pictures that are not recorded but only tentatively compression coded is classified as I picture, P picture or B picture according to its predictive moving direction as shown in FIG. 11 to produce a group of 15 pictures containing an I picture, four P pictures and 10 B pictures, which is referred to as GOP. Then, this allocation is applied to not only the 15 pictures of the learning step but also to every GOP of 15 pictures of the subsequent series of moving pictures to be actually taken.

Generally, in the process of compression coding a series of moving pictures arranged to show a GOP structure, the number of bits generated per picture by compression coding differs greatly depending on the type of picture. For example, a P picture obtained by reducing the inter-frame redundancy of data by forwardly predicting motions in successive frames arranged on the time base and a B picture obtained by reducing the inter-frame redundancy of data by not only forwardly but also backwardly predicting motions in successive frames also arranged on the time base obviously contain less number of generated bits than an I picture adapted to intra-frame coding. Additionally, a B picture normally contains less number of generated bits than a P picture because the former can reduce the redundancy of data both forwardly and backwardly. Thus, it is important to assign an adequate volume of codes to each frame to be subjected to compression coding depending on the type of picture.

Furthermore, the number of generated bits can vary among pictures of a same type depending on the input series of moving pictures. More number of bits will be generated in a series of moving pictures to be compression coded shows an abrupt and quick motion than in a series of moving pictures showing only a relatively slow motion. For example, there may be cases in detentfining a motion vector where the motion to be detected is beyond the capacity of the camera and the motion being observed quickly goes out of the frame so that no optimal value can be obtained for the motion vector. Additionally, when the camera is operated too quickly for panning, zooming-in or zooming-out, the value of the motion vector may not be appropriately determined.

In any of cases where an abrupt and quick motion is involved, the number of bits generated in a P or B picture tends to become disproportionally larger than the number of bits generated in an I picture. This phenomenon occurs because the inter-frame difference of the motion predicted by P and B pictures is not reduced proportionally so that consequently the volume of codes of the P and B pictures increases.

On the other hand, in occasions where the pictures to be taken contain only a slow motion and appear like still pictures, the number of bits generated in a P or B picture tends to become disproportionally smaller than the number of bits generated in an I picture. This phenomenon occurs because, when there is practically no motion, the inter-frame difference of the motion predicted by P and B pictures is remarkably reduced to consequently decrease the volume of codes of the P and B pictures.

Thus, what is important here is to grasp the characteristics of the motion in the series of moving pictures to be taken from the motion in the frames to be compression coded and the inter-frame difference obtained from the predicted motion.

Still additionally, the number of generated bits can vary depending on the complexity of image of the series of moving pictures input to the embodiment regardless of the variances observed among the picture types as a function of the motion of the input pictures. In other words, regardless of the magnitude of the motion of the input series of moving pictures and the picture types, the picture data of the frames to be compression coded have their intrinsic complexity. Differently stated, if two different series of moving pictures show a similar motion, the number of generated bits can vary greatly between the two series depending on the amount of latent information each of the frames of the series contains.

The complexity of coding within a frame can be realized from the number of bits generated in an P picture. It may also be possible to estimate the high frequency components of the picture signal contained in a frame that plays a vital role in determining the volume of codes of the DCT coefficient by accumulating the differences of adjacent pixels to see the variances within the frame or by observing the distribution of the differences. Alternatively, the high frequency components may be estimated by observing the flatness of the picture signal within the frame.

Thus, it is important to estimate the complexity of the input series of moving pictures relative to the target bit rate on the basis of the intrinsic complexity of coding of each frame to be compression coded.

From the above, it will be appreciated that it is possible to improve the efficiency of compression coding and hence the quality of picture observed after a companding process by introducing a processing operation that reflects the various characteristics of the input series of moving pictures from the viewpoint of compression coding. Additionally, the characteristics of each frame and those of each GOP may also be used for the above processing operation. Still additionally, the characteristics of each macro-block may be made to contain its positional information within the frame. Namely, the efficiency of compression coding can be farther improved by additionally using the information on the motion in each of the macro-blocks of each picture and the volume of codes of each of the macro-blocks.

In practice, it is necessary to efficiently perform the operation of compression coding within the target bit rate provided by the real time processing. For this purpose, in any of the above embodiments, a series of moving pictures input immediately before the start of an actual recording operation of the camera is utilized to obtain values for the various parameters to be used for the compression coding that matches the target bit rate in order to reliably control the bit rate and make it suitable for the operation of compression coding the series of moving pictures to be actually taken immediately thereafter. More specifically, with a video camera, it can safely be assumed that the series of pictures that is input to the camera the instant when the user starts the shooting operation does not significantly differ from the series of pictures taken immediately thereafter so that the characteristics of the latter series of moving pictures can be obtained by analyzing those of the former series. The camera compression control unit 6 is responsible to this processing operation.

The camera compression control unit 6 keeps on observing the characteristics of the pictures input to the embodiment after the start of the actual recording operation to exploit the fact that the characteristic values can be carried over in the subsequent series of pictures being taken by the camera so that the result of the observation may be reflected onto the sequential compression coding operation on a GOP by GOP basis or a frame by frame basis. On the other hand, if there occurs a quick panning or zooming operation on the part of the camera or an abrupt and remarkable motion on the part of the object being shot, such a motion is detected from the characteristic values by the camera compression control unit 6, which by turn takes an necessary action for appropriately responding the detected motion.

Figure 12:
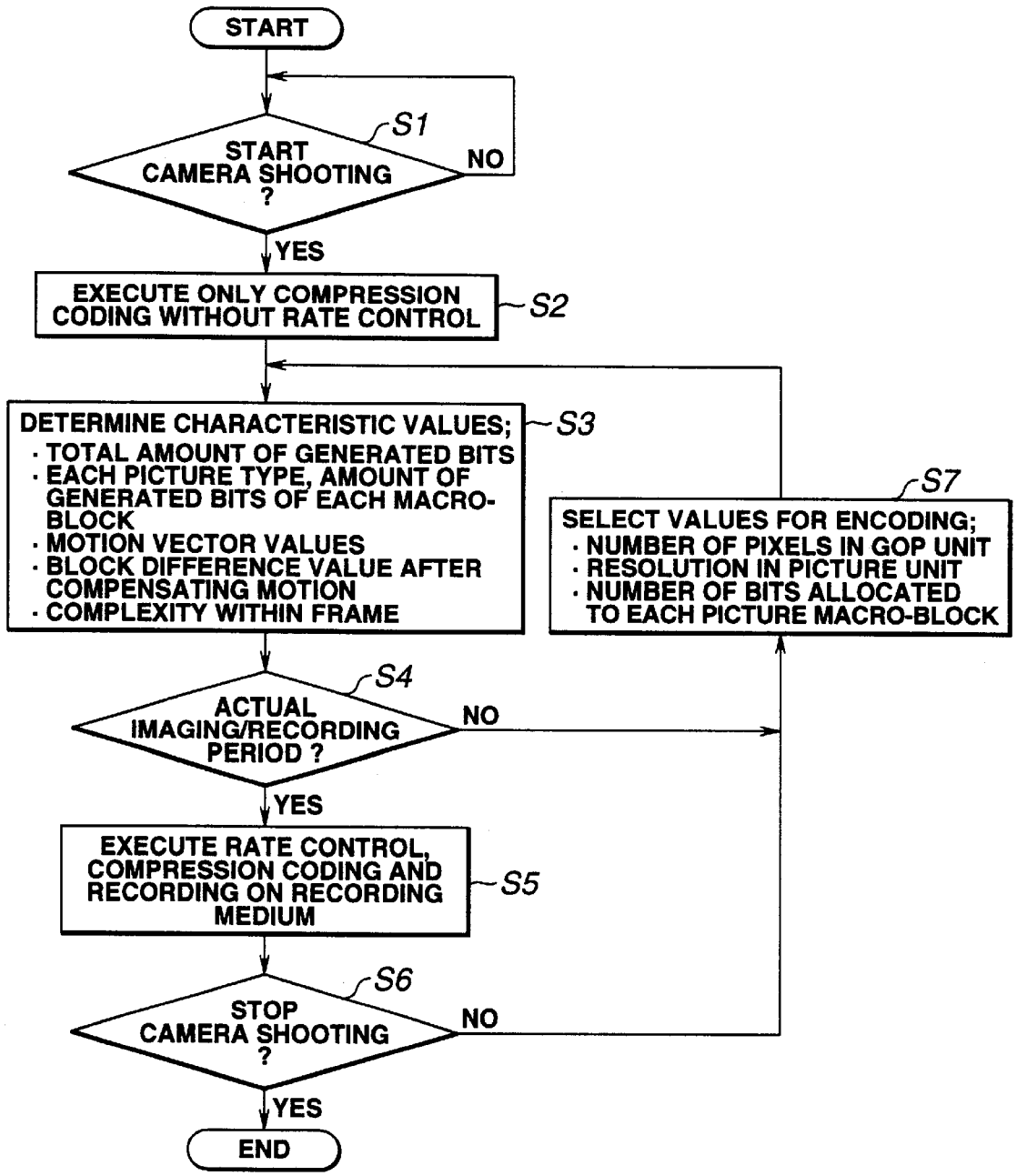
FIG. 12 is a flow chart of the operation of the camera compression control unit of the apparatus of FIG. 1.

The operation of the camera compression control unit 6 will be described further by referring to the flow chart of FIG. 12. Firstly, in Step S1, it determines if the camera is operated to start shooting or not. If it is found that the shooting start button is just depressed, it does not drive the write device 4 and puts the camera into the learning mode for a period equal to 15 frames (1 GOP) from that moment. In the learning mode, it does not follow the ordinary control procedure but executes only a compression coding operation, maintaining the quantization coefficient to a predetermined value in Step S2 in order to qualitatively observe the level of volume of information contained in the pictures to the camera.

Then, in Step S3, the total number of generated bits, the number of bits generated for each of the picture types, the number of bits generated in each of the macro-blocks, the motion vector value and the differences among the blocks after motion compensation as well as various characteristic values concerning the level of complexity of each of the frames. The value of twice (=30 frames/15 frames) of the total number of generated bits is used as the rate of generation of bits per second or the bit rate when the bit generation is not controlled.

Then, it is determined in Step S4 if an actual shooting period has started or not. It is determined in the above described instance that no actual shooting period has started and the processing operation proceeds to Step S7, where the resolution and the number of pixels are initialized by the preprocessor 11 for the imaging/recording mode on the basis of the dimensional relationship between the above bit rate and the target bit rate that reflects the difference between the rough bit rate required by the series of input moving pictures and the target bit rate and the differences among the blocks after motion compensation that reflect the volume of information generated directly by a motion.

If, for example, it is found that an extremely large volume of information is generated or large differences are produced among the blocks to reflect an abrupt and rapid motion and the status quo of the matching of motion compensation, it will be so determined that it is highly difficult to encode the series of pictures being taken when viewed in terms of the target bit rate. Then, the filter characteristics will be modified to reduce the high frequency components and the number of pixels will be reduced horizontally in order to reduce the volume of information to be used to convert the resolution and the number of pixels.

Additionally, the number of bits to be assigned to each picture type is controlled and initialized so as to be efficiently used in a GOP by on the basis of the number of bits generated for the picture type and the target bit rate. For example, in a case where the pictures show little motion and the number of bits generated in a P picture or a B picture is rather small, a relatively large target number of bits is assigned to each I picture if compared with a P or B picture. Conversely, in a case where the pictures produces a large volume of information for a motion contained therein and hence a large number of bits are generated in P and B pictures, the number of bits to be assigned to each I picture will be reduced while a large number of bits will be assigned to each of P and B pictures. Still additionally, the number of bits required for the macro-blocks contained in each picture is determined from the number of bits generated in each macro-block and the number of bits to be assigned to each I picture is determined on a macro-block by macro-block basis.

For instance, an abrupt or slow motion may be observed from the motion vector of each macro-block and the differences among the blocks after motion compensation. Then, the target number of bits assigned to each picture can be efficiently allocated to predetermined levels in the picture.

On the other hand, if it is determined in Step S4 that an actual shooting period has started, the processing operation proceeds to Step S5, where the series of input pictures are coded and recorded onto the recording medium at a rate controlled by the camera compression control unit 6. Meanwhile, the operation of selecting values for the next GOP and the macro-blocks thereof are conducted on the basis of the various characteristic values obtained in Step S3.

Then, Step S6, it is determined if the shooting operation of the camera has stopped or not and, if it is determined that the shooting operation of the camera has not stopped, the processing operation returns to Step S7 to repeat Steps S3 through S7. If, on the other hand, it is determined that the shooting operation of the camera has stopped, then the processing operation will be terminated.

Now, a typical example of operation of controlling an input sequence involving a dynamic conversion of resolution and the number of pixels that occurs on a GOP by GOP basis will be described below. Note that the use of a closed GOP structure is assumed in the following description.

Figure 13:
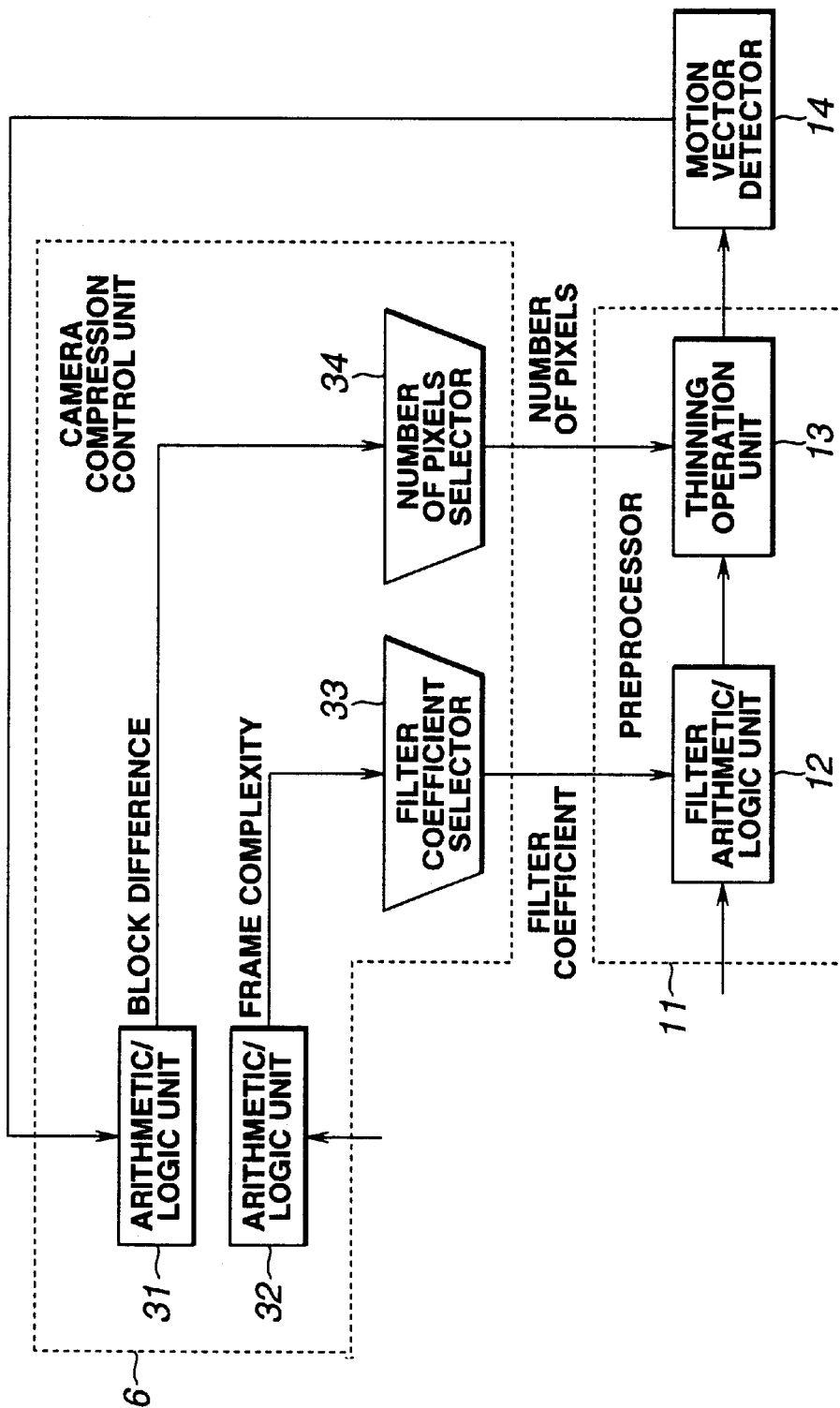
FIG. 13 is a schematic block diagram of the camera compression control unit of FIG. 1 to be used for converting the resolution and the number of pixels.

FIG. 13 is a schematic block diagram of a control unit that can be used for converting the resolution and the number of pixels for the purpose of the invention. The control unit is designed to perform an operation of resolution conversion and that of converting the number of pixels according to the characteristic values of the macro-blocks of a frame and the frame itself such as the differences among the blocks after motion compensation and the intra-frame complexity that indicates the volume of motion within the frame.

Figure 14:
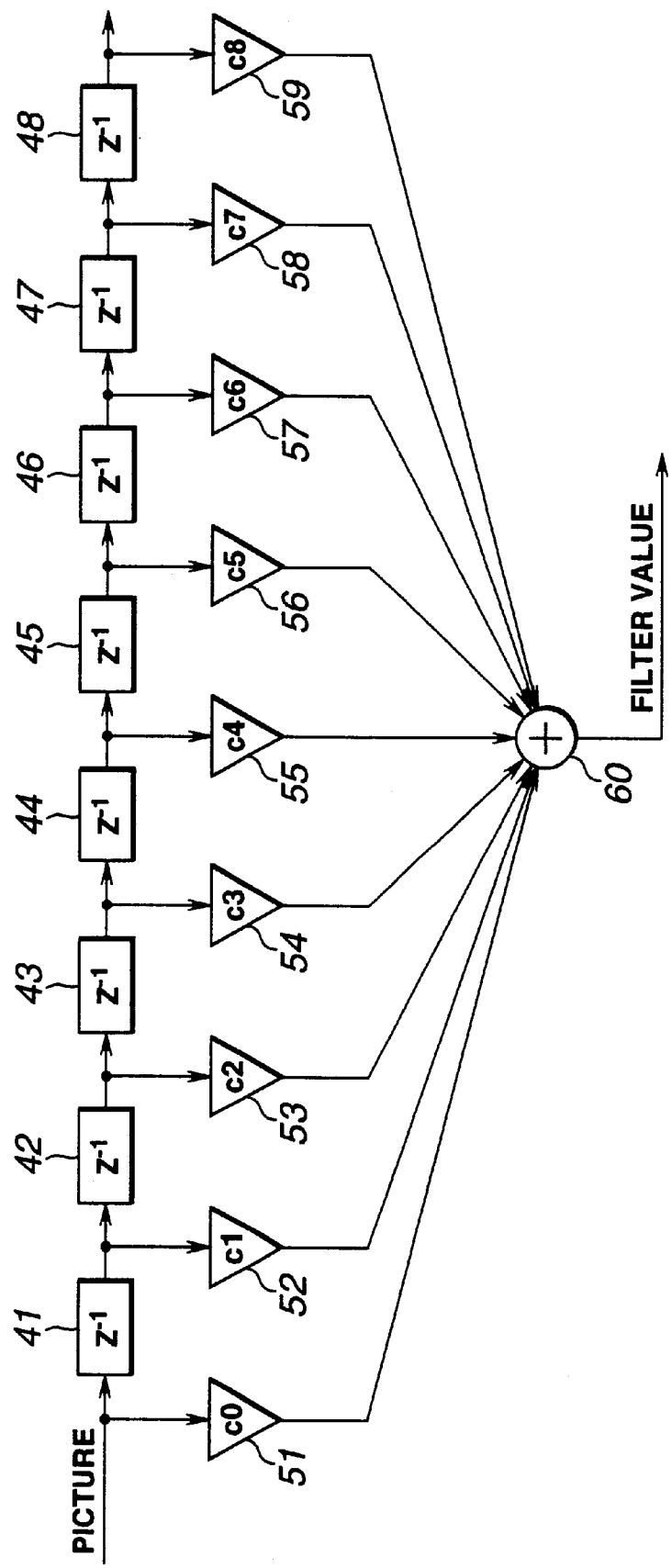
FIG. 14 is a schematic block diagram of the digital filter of the filter arithmnetic/logic unit of the apparatus of FIG. 1.

The preprocessor 11 comprises a filter arithmetic/logic unit 12 that uses a digital filter for appropriately thinning data on a frame by frame basis. While such a filter unit generally shows low pass characteristics, the unit of this example is adapted to select either of the two types of resolution conversion of frequency characteristics as shown in A and B of FIG. 10 by modifying the number of taps and the filter coefficients and changing the filter characteristics including the cut-off frequency. FIG. 14 is a schematic block diagram of digital filter that can be used for the filter unit. The filter is a 9-tap one-dimensional FIR (finite impulse response) type digital filter. In FIG. 14, C0 through C8 denote respective filter coefficients of the digital filter and (Z-1) 41 through 48 denote respective delay elements, each being adapted to delay a pixel cycle. The values of the coefficients and those of the levels of the horizontally arranged picture signals are multiplied to each other respectively in multipliers 51 through 59 and the products of the multiplications are added by adder 60 to produce the output of the filter.

Thinning operation unit 13 performs an operation of appropriately converting the number of horizontal pixels on a GOP by GOP basis. In this example, either 704 pixels (1×1 conversion) as shown in A of FIG. 3 or 352 pixels (1×2 conversion) as shown in C of FIG. 3 is selected for pixel number conversion using a thinning operation. As will be described hereinafter by referring to FIG. 18, to decode the bit stream produced by coding and restore the original picture signal, the pixel number conversion selected for the thinning operation will be inverted and the horizontal 704 pixels will be restored.

Filter coefficient selector 33 (determining means) for selecting filter coefficients necessary for the frequency characteristics to be realized by the filter arithmetic/logic unit 12 and pixel number selector 34 (determining means) for selecting the number of pixels to be realized by the thinning operation unit 13 are used for the above selecting operation. In other words, the camera compression control unit 6 of FIG. 1 comprises the filter coefficient selector 33 and the pixel number selector 34.

One of the characteristic values as used herein to represent the above described intra-frame complexity is the sum of the absolute values of the level differences among the horizontal pixels of the input picture obtained over the entire frame (hereinafter referred to as frame complexity (FC)). In this example, if the level of the horizontally i-th and vertically j-th pixel is d(i,j), the frame complexity (FC) is obtained by formula (1) below.

$$FC = \sum_{j=1}^{n} \sum_{i=2}^{m} |d(i, j) - d(i-1, j)| \quad (1)$$

where m represents the number of pixel of each line and n represents the number of lines of each frame.

Figure 15:
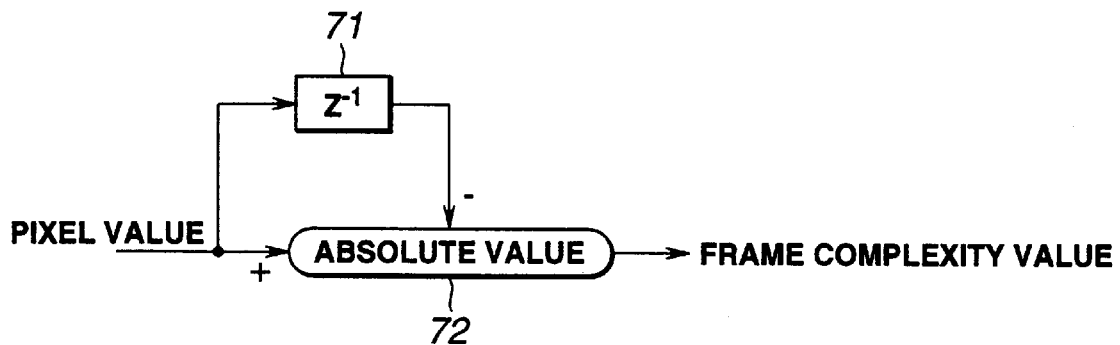
FIG. 15 is a schematic circuit diagram of the circuit for determining the frame complexity.

Thus, the input picture is arranged one-dimensionally so that it may sequentially be scanned from the upper left corner to the lower right corner and the level difference of any two adjacent pixels is determined for the arithmetic operation of determining FC by using formula (1) above. The arithmetic/logic unit 32 of FIG. 12 is used for the above operation. FIG. 15 is a schematic circuit block diagram that can be used for the arithmetic/logic unit 32. The input pixel value is fed to the arithmetic/logic circuit 72 and the delay element 71 and the arithmetic/logic circuit 72 determines the absolute value of the difference between the pixel value of the input pixel and that of the immediately preceding pixel fed to it by way of the delay element 71. Such an absolute value is determined for all the pixels and sequentially added by using equation (1) above.

Figure 16:
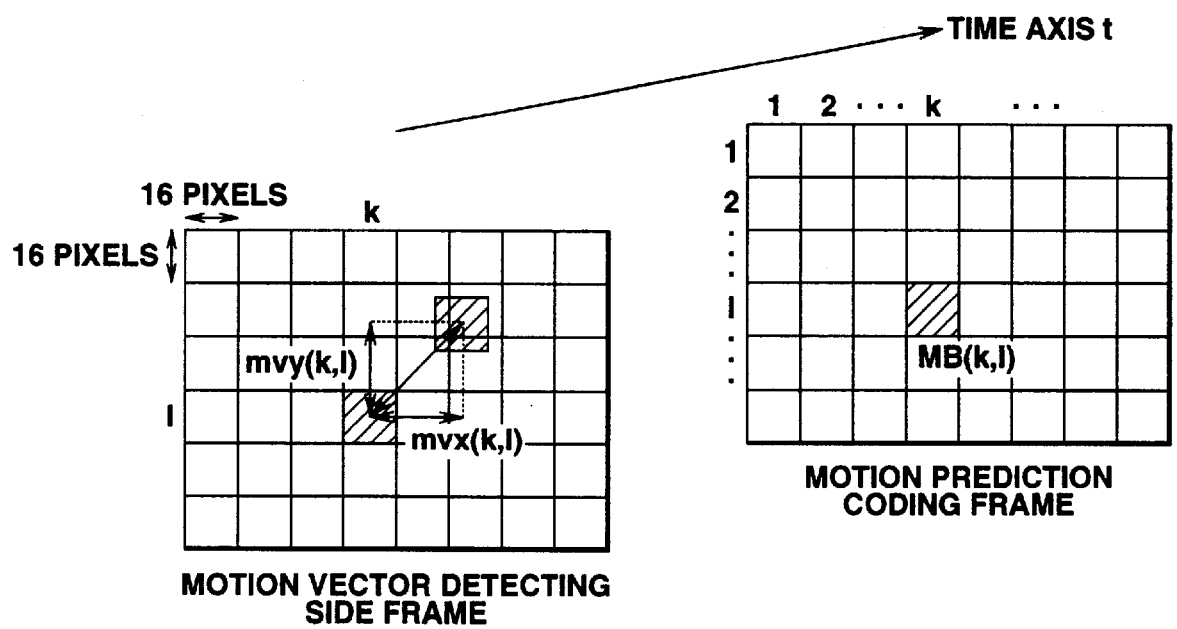
FIG. 16 is a schematic illustration of the relationship between a motion vector and a frame.

FIG. 16 is a schematic illustration of the relationship between a motion vector and a frame. Referring to FIG. 16, the motion vector obtained for each of the macro-blocks produced by dividing a P picture by 16 pixels both horizontally and vertically is used to determine the sum of the absolute values of the differences among the macro-blocks after motion compensation (hereinafter referred to as block difference (BD)). The block difference BD (k, 1) of the horizontally k-th and vertically 1-th macro-block of a frame is obtained by formula (2) below.

$$BD(k, l) = \sum_{j=1}^{16} \sum_{i=1}^{16} |dc(16 \times (k-1) + i, 16 \times (l-1) + j) - dt(16 \times (k-1) + i + mvx(k, l), 16 \times (l-1) + j + mvy(k, l))| \quad (2)$$

where mvx (k, 1) represents the horizontal value of the motion vector of the macro-block MB (k, 1) and mvy (k, 1) represents the vertical value of the motion vector of the macro-block MB (k, 1). The level value of the horizontally i-th and vertically j-th pixel of the frame located forwardly along the time axis and used for detecting the motion vector is expressed by dt (i, j) and the level value of the horizontally i-th and vertically j-th pixel of the frame located backward along the time axis and used for motion compensation and predictive coding is expressed by dc (i, j).

Thus, the block difference value BD of the entire frame is obtained by adding all the BD (k, 1) values of the frame and expressed by formula (3) below.

$$BD = \sum_{l=1}^{n/16} \sum_{k=1}^{m/16} BD(k, l) \quad (3)$$

The arithmetic/logic section 31 is responsible for obtaining the block difference value BD.

The frame complexity FC and the block difference BD is then analyzed for each frame and for each GOP to select the filter coefficients and the number of pixels for the next frame and the next GOP. Then, it is determined if the obtained block difference value BD of the P pictures in the GOP is greater or smaller than a given reference value so that the number of pixels to be used for the pixel number conversion of the next GOP may be selected stepwise. Similarly, it is determined if the frame complexity FC obtained for each of the frames of the GOP is greater or smaller than a given reference value so that the filter coefficients to be used for the resolution conversion of the next frame may be selected stepwise.

Then, if the block difference value BD is greater than the corresponding reference value, the pixel number will be reduced and, if the frame complexity value FC is greater than the corresponding reference value at the same time, the resolution will be modified by means of the filter coefficients so as to attenuate the high frequency components of the frequency characteristics.

Figure 17:
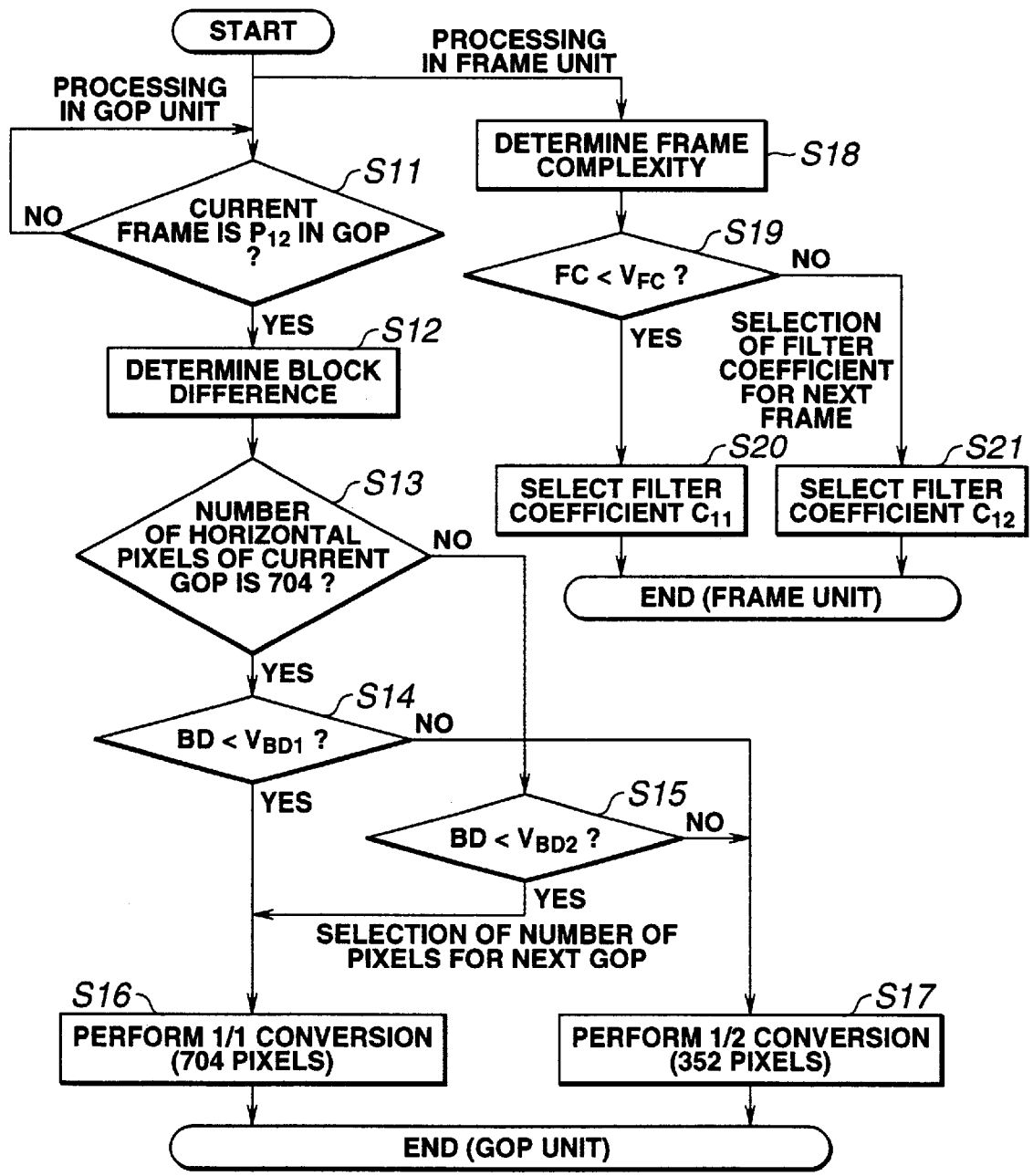
FIG. 17 is a flow chart of the operation of selecting the resolution and the number of pixels for the purpose of the invention.

Now, the operation of selecting the resolution and the number of pixels will be described by referring to the flow chart of FIG. 17. As for the operation for each GOP, it is determined in Step S11 if the current frame is a P picture of the temporally 12th frame of a closed GOP as shown in B of FIG. 11. If it is determined that the frame is a P picture of the 12th frame, the processing operation proceeds to Step S12, where the arithmetic/logic section 31 operates to determine the block difference value BD.

Then, in Step S13, it is determined if the number of horizontal pixels of the current GOP is 704 or 352. If it is determined that the number of horizontal pixels of the current GOP is 704, the processing operation proceeds to Step S14, where it is determined if the block difference value BD is smaller than a given reference block difference value $V_{BD1}$ to be sued for specifying the pixel number conversion in the next GOP or not. If it is determined that the block difference value BD is smaller than the reference block difference value $V_{BD1}$, the processing operation proceeds to Step S16, where the pixel number selector 34 selects 704 pixels for the next GOP (1/1 conversion) as in the case of the current GOP.

If it is determined in Step S14 that the block difference value BD is greater than or equal to the reference block difference value $V_{BD1}$, the processing operation proceeds to Step S17, where the pixel number selector 34 selects 352 pixels for the next GOP (1/2 conversion), which is 1/2 of the number of pixel of the current GOP.

If, on the other hand, it is determined in Step S13 that the number of horizontal pixels of the current GOP is not 704 but 352, the processing operation proceeds to Step S15, where it is determined if the block difference value BD is smaller than another given reference block difference value $V_{BD2}$ or not. If it is determined that the block difference value BD is smaller than the reference block difference value $V_{BD2}$, the processing operation proceeds to Step S16, where 704 pixels will be selected for the pixel number of the next GOP (1/1 conversion). If it is determined that the block difference value BD is greater than or equal to the reference block difference value $V_{BD2}$, the operation proceeds to Step S17, where 352 pixel will be selected for the pixel number of the next GOP (1/2 conversion) as in the case of the current GOP.

All the processing operation on the GOP basis will be completed when the operation of Step S16 or S17 is over.

As for the processing operation on the frame basis, the frame complexity is determined in Step S18 for each frame in a manner as described above. Then, in Step S19, it is determined if the frame complexity value FC obtained in Step S18 is smaller than a reference frame complexity value $V_{FC}$ to be used for specifying the filter coefficients that are used for the resolution conversion of the next frame or not. If it is determined that the frame complexity value FC is smaller than a reference frame complexity value $V_{FC}$, the processing operation proceeds to Step S20, where the filter coefficient selector 33 selects a filter coefficient $C_{f1}$ for the next frame. If, on the other hand, it is determined that the frame complexity value FC is greater than or equal to a reference frame complexity value $V_{FC}$, the processing operation proceeds to Step S21, wherein filter coefficient $C_{f2}$ will be selected.

In the case of the above embodiment, the digital filter having the filter characteristics of $C_{f2}$(e.g., B in FIG. 10) shows a cut off frequency lower than that of the digital filter having the filter characteristics of $C_{f1}$ (e.g., A in FIG. 10).

All the processing operation on the frame basis will be completed when the operation of Step S20 or S21 is over.

As a result of the above processing operation, the camera compression control unit 6 completes its operation of determining the block difference to be used for the pixel number conversion conducted on the GOP basis for the input pictures and the frame complexity to be used for the resolution conversion conducted on the frame basis for the input pictures.

Figure 18:
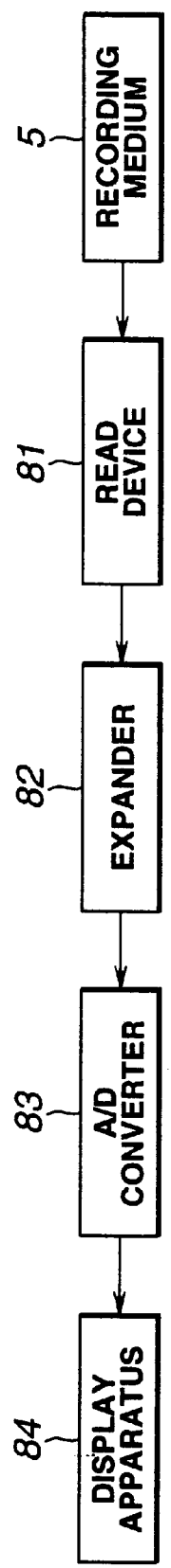
FIG. 18 is a schematic block diagram of a replaying apparatus.

FIG. 18 is a schematic block diagram of a replaying apparatus adapted to replaying the moving pictures recorded on a recording medium 5 by means of a moving picture compression recording apparatus as illustrated in FIG. 1. Read device 81 is designed to read out the moving picture data compressed and recorded on the record medium 5. Expander 82 expands the moving picture data read out by the read device 81. D/A converter 83 converts the moving picture data expanded by the expander 82 into analog video signals. Display apparatus 84 displays the moving pictures of the analog video signals fed from the D/A converter 83.

Figure 19:
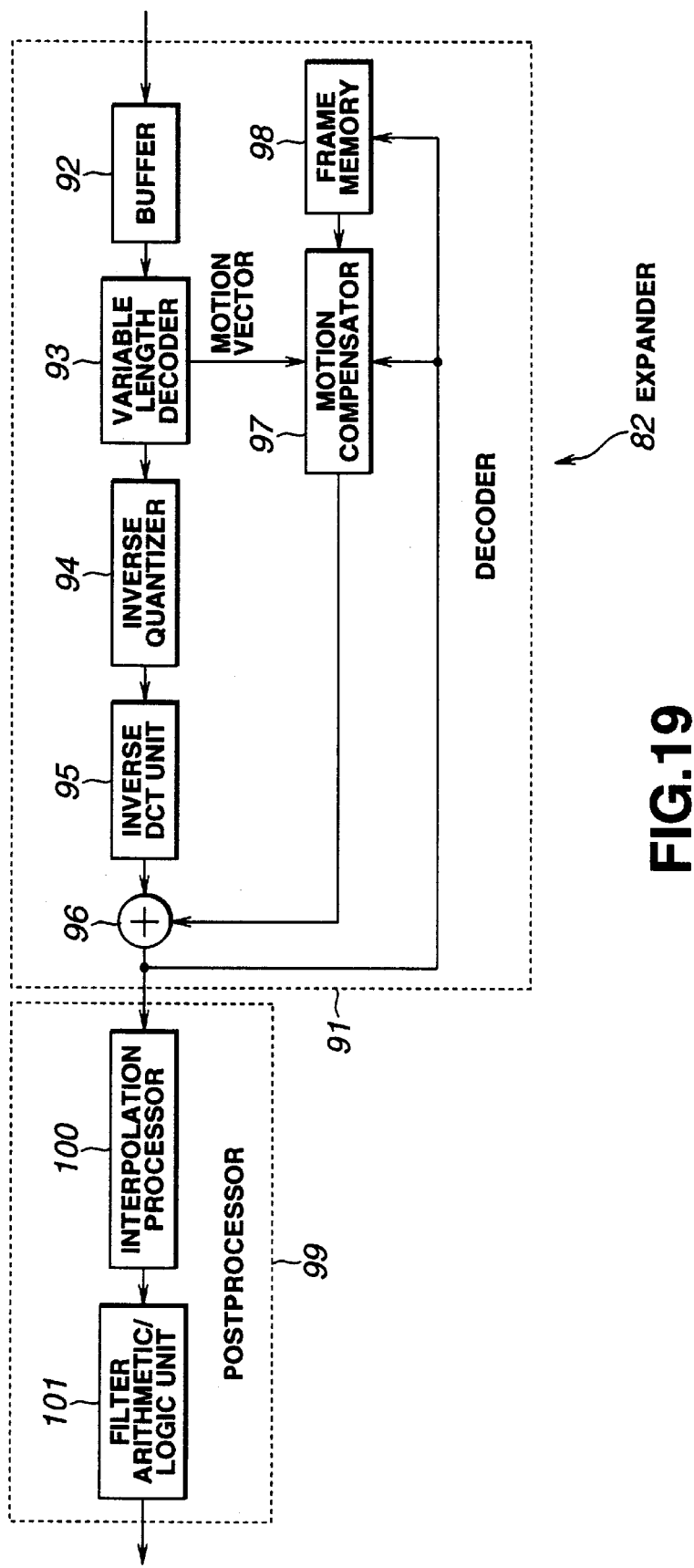
FIG. 19 is a schematic block diagram of an expander.

FIG. 19 is a schematic block diagram of the expander 82 of FIG. 18, showing its configuration in greater detail. The expander 82 comprises a decoder 91 and a post processor 99. The decoder 91 comprises a buffer 92 for temporarily storing the coded data fed from the read device 81. Variable length decoder 93 performs a processing operation of variable length decoding on the coded data fed from the buffer 92 and supplies inverse quantizer 94 with the processed data and the motion compensator 97 with the motion vector of the moving pictures.

The motion compensator 97 generates motion-compensated data from the motion vector fed from the variable length decoder 93, the data fed to it by way of adder 96 and the data fed from frame memory 98 and outputs the generated data.

The postprocessor 99 performs a processing operation of interpolation necessary for restoring the original number of pixels by referring to the pixel number conversion performed by the thinning operation unit 13 of the preprocessor 11. Filter arithmetic/logic unit 101 performs predetermined filter arithmetic/logic operations on the data produced by the interpolation processor 100 after the interpolating operation.

Now, the operation of the expander 82 will be discussed below. Firstly, the picture data recorded on the recording medium 5 by the read device 81 are read out and fed to the expander 82. The picture data are then temporarily stored in the buffer 92 of the decoder 91 of the expander 82 and thereafter fed to the variable length decoder 93 for a processing operation of variable length decoding. The data processed by the variable length decoder 93 are then fed to the inverse quantizer 94. On the other hand, the motion vector is fed to the motion compensator 97.

The data fed to the inverse quantizer 94 are subjected to an inversely quantizing operation and then fed to the inverse DCT processor 95 for a processing operation of inverse DCT. The data produced by the inverse DCT processor 95 are then fed to the adder 96, which adds the motion compensation signals generated by the motion compensator 97 in a manner as described below and the data produced by the inverse DCT processor 95 and the outcome of the operation of the adder 96 is fed to the postprocessor 99, the motion compensator 97 and the frame memory 98.

The motion compensator 97 generates data that have been motion-compensated by it on the basis of the motion vector fed from the variable length decoder 93, the data supplied to it by way of the adder 96 and the data fed from the frame memory 98 and supplies the adder 96 with the generated data.

The data fed to the postprocessor 99 are subjected to a processing operation of interpolation of the interpolation processor 100 and then fed to the filter arithmetic/logic unit 101 for predetermined filter arithmetic/logic operations. As a result, the data are converted to those for frames with the original number of pixels. The data subjected to the filter arithmetic/logic operations of the filter arithmetic/logic unit 101 are then fed to the D/A converter 83, where they are converted to analog video signals and fed to the display apparatus 84. The display apparatus displays the moving pictures of the signals it receives.

As described above, it is now possible to efficiently process the moving pictures being taken by a digital video camera for compression coding by estimating some of the characteristic aspects of the series of moving pictures to be taken on the basis of the pictures input immediately therebefore so as to improve the quality of the pictures restored by expansion. Additionally, the imaging operation can be appropriately initialized by learning various characteristic values of the pictures input at the very start of imaging and also of the pictures being taken in the imaging operation, while compressing coding the pictures, so that the parameters for the sequential compression coding can be updated continuously to reflect any changes in the pictures being taken. Thus, the quality of the obtained pictures can be remarkably improved.

While some of the characteristic values of the pictures input at the very start of an imaging operation are used in the above description, it may alternatively be so arranged that such values are obtained not at the very start of an imaging operation but continuously from the time when the camera is set ready for imaging.

While the operation of determining the block difference is conducted by referring to the P picture of the 12th frame in each GOP in the above description, it may alternatively be so arranged that some other predictive-coded frame (P picture, B picture) in the GOP is referenced. Still alternatively, the change in the block difference values of such predictive-coded frames within the GOP may be used.

While each GOP is made to comprise 15 frames in the above description, the GOP may alternatively comprise any other appropriate number of frames.

While the above embodiment is described in terms of a digital video camera, it will be appreciated that the present invention is applicable to a digital still camera for recording and reproducing still pictures.

What is claimed is:

1. A video signal processing apparatus for encoding video signal pictures on the basis of groups of pictures, comprising:

input means for receiving input video signals;

specification means for specifying the resolution of said input video signals;

control means for controlling the number of pictures in two temporally adjacent groups of pictures to have a number combination of pictures selected from 21+9, 18+12, 15+15, 12+18 and 9+21; the number of pictures in each group being determined to control a changing point between the two groups such that the specified resolution of the video signals is maintained at a constant value; and coding means for coding said two groups of pictures.

2. A video signal processing apparatus according to claim 1, wherein said coding means includes means for encoding said video signals, using as unit a group of pictures comprising intra-coded pictures, forwardly predictive-coded pictures subjected to forwardly predictive-coding along the display sequence and bidirectionally predictive-coding pictures subjected for forwardly and backwardly predictive-coding along the display sequence.

3. A video signal processing apparatus according to claim 1, wherein said coded video signals conform to the MPEG2 (Moving Pictures Experts Group Phase 2) Standards.

4. A video signal processing method of encoding video signal pictures on the basis of groups of pictures, comprising the steps of:

specifying the resolution of said input video signals;

controlling the number of pictures in two temporally adjacent groups of pictures to have a number combination of pictures selected from 21+9, 18+12, 15+15, 12+18 and 9+21; the number of pictures in each group being determined to control a changing point between the two groups such that the specified resolution of the video signals is maintained at a constant value; and coding said two groups of pictures.

5. A video signal processing method according to claim 4, wherein said coding step includes a step of encoding said video signals, using as unit a group of pictures comprising intra-coded pictures, forwardly predictive-coded pictures subjected to forwardly predictive-coding along the display sequence and bidirectionally predictive-coding pictures subjected for forwardly and backwardly predictive-coding along the display sequence.

6. A video signal processing method according to claim 4, wherein said coded video signals conform to the MPEG2 (Moving Pictures Experts Group Phase 2) Standards.

* * * * *